United States Patent
Hoshino et al.

(10) Patent No.: US 11,399,130 B2
(45) Date of Patent: Jul. 26, 2022

(54) FOCUS ADJUSTMENT DEVICE AND FOCUS ADJUSTMENT METHOD

(71) Applicant: Olympus Corporation, Hachioji (JP)

(72) Inventors: Tomohiro Hoshino, Hachioji (JP); Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 304 days.

(21) Appl. No.: 16/721,869

(22) Filed: Dec. 19, 2019

(65) Prior Publication Data

US 2020/0236291 A1  Jul. 23, 2020

(30) Foreign Application Priority Data

Jan. 18, 2019 (JP) .............................. JP2019-007247

(51) Int. Cl.
*H04N 5/232* (2006.01)
*G02B 7/38* (2021.01)

(52) U.S. Cl.
CPC ......... *H04N 5/232127* (2018.08); *G02B 7/38* (2013.01); *H04N 5/23216* (2013.01)

(58) Field of Classification Search
CPC ......... H04N 5/232127; H04N 5/23216; H04N 5/232; H04N 5/23219; H04N 5/232123; G02B 7/38
See application file for complete search history.

(56) References Cited

U.S. PATENT DOCUMENTS

| | | | | |
|---|---|---|---|---|
| 2010/0322611 A1* | 12/2010 | Yoshida | ................. | G03B 13/30 396/104 |
| 2013/0182900 A1* | 7/2013 | Ishii | ........................ | G06K 9/78 382/103 |
| 2013/0278809 A1* | 10/2013 | Itoh | ........................ | G03B 13/20 348/333.01 |

FOREIGN PATENT DOCUMENTS

| | | |
|---|---|---|
| JP | 2007-199261 A | 8/2007 |
| JP | 2015-087706 A | 5/2015 |

* cited by examiner

*Primary Examiner* — Yogesh K Aggarwal
(74) *Attorney, Agent, or Firm* — John C. Pokotylo; Pokotylo Patent Services

(57) ABSTRACT

A focus adjustment method comprising setting a first range including at least one AF area, or a second range including the first range, every time the defocus amount is detected, selecting the first range or the second range based on a focus target position of an AF area included in the second range, and a reference position, updating the reference position based on the plurality of focus target positions of AF areas included in the range that has been selected, and the reference position, and selecting an AF area used in the focus adjustment from the plurality of AF areas, based on the plurality of focus target positions of AF areas included in the range that has been selected, and the reference position that has been updated.

20 Claims, 19 Drawing Sheets

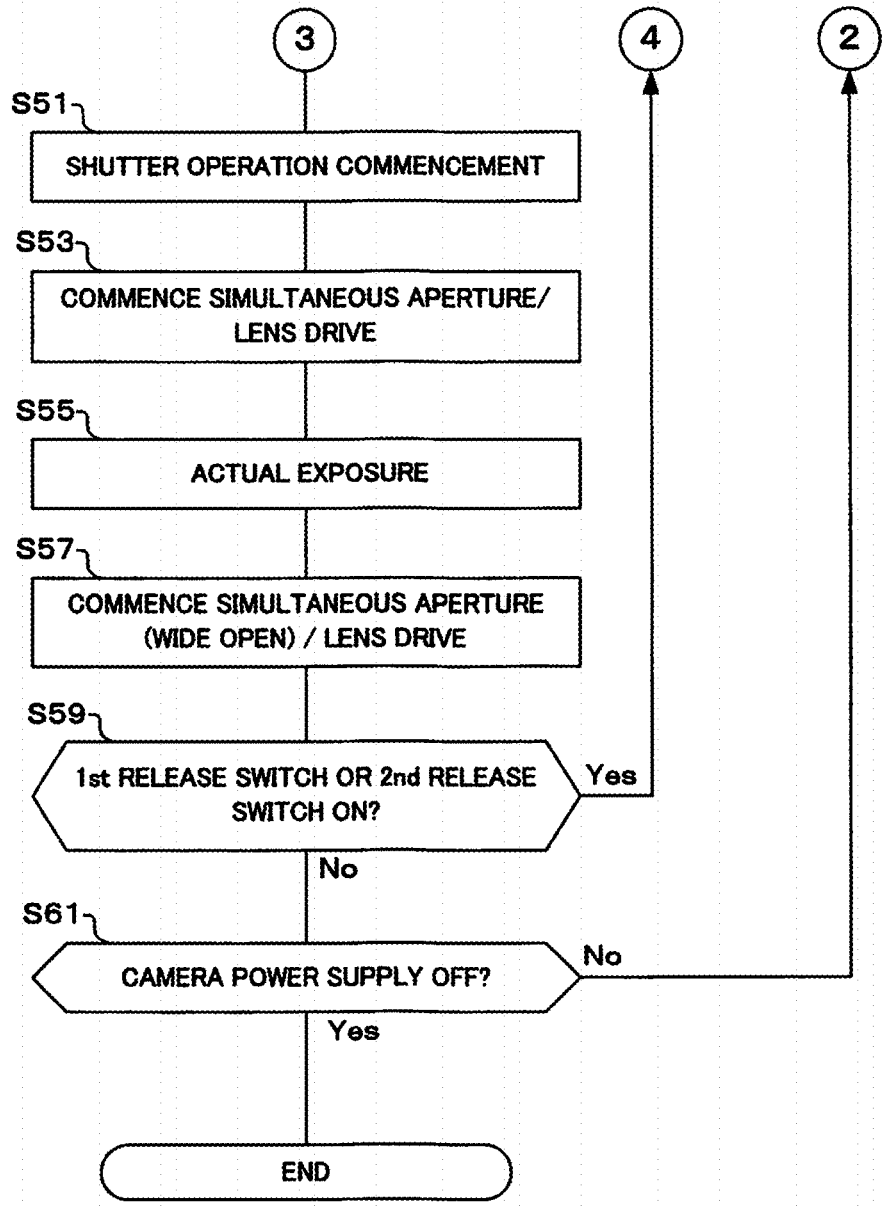

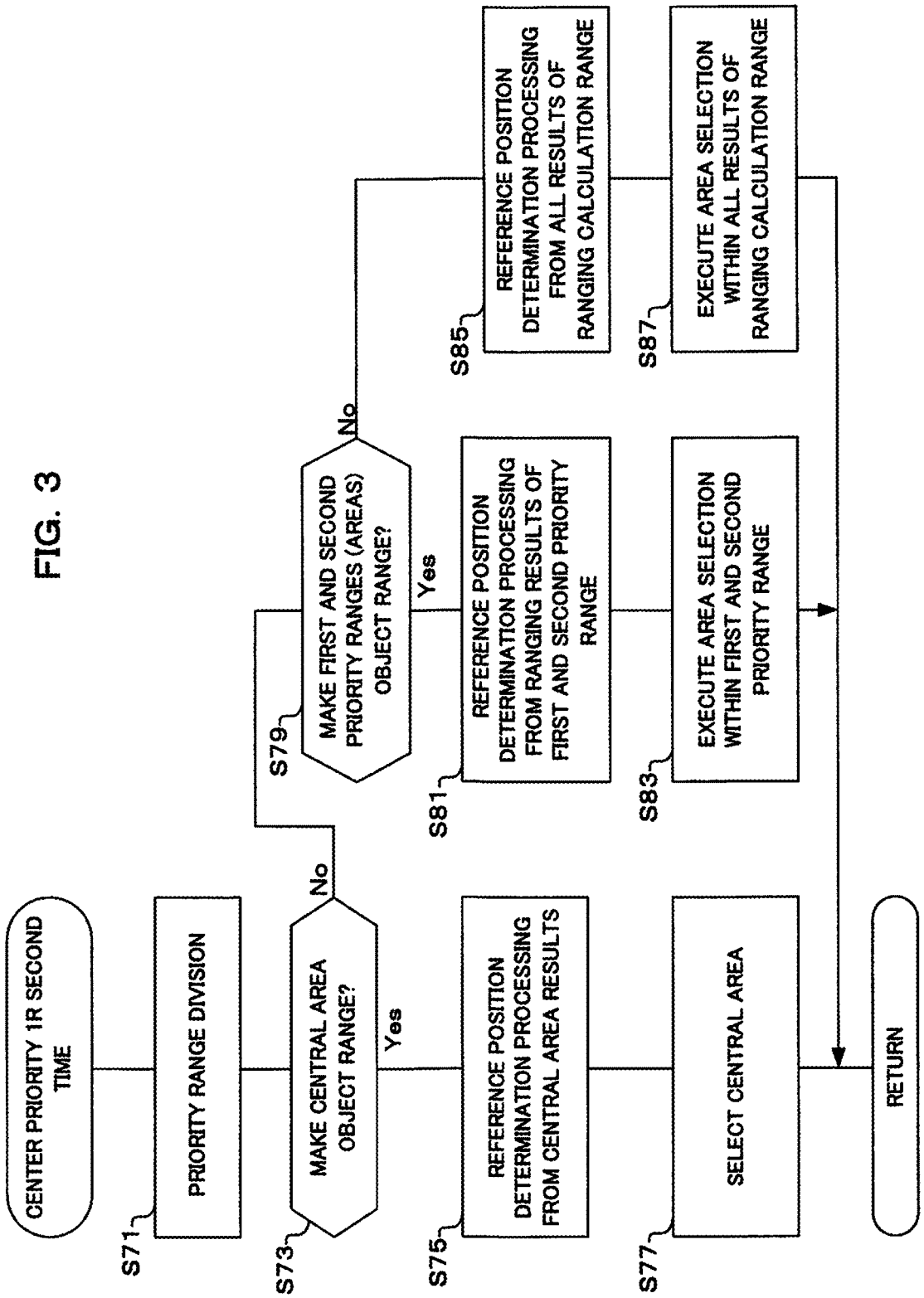

FOCUS ADJUSTMENT DEVICE AND FOCUS ADJUSTMENT METHOD

CROSS-REFERENCE TO RELATED APPLICATIONS

Benefit is claimed, under 35 U.S.C. § 119, to the filing date of prior Japanese Patent Application No. 2019-007247 filed on Jan. 18, 2019. This application is expressly incorporated herein by reference. The scope of the present invention is not limited to any requirements of the specific embodiments described in the application.

BACKGROUND OF THE INVENTION

1. Field of the Invention

The present invention relates to a focus adjustment device and focus adjustment method that perform focus adjustment of a focus lens based on defocus amount.

2. Description of the Related Art

There are various subjects within a photographing screen, with AF (autofocus) areas provided for focusing on either of the subjects, and technology has been proposed to select either of the AF areas. There is technology for, when performing the selection, selecting an AF area based on defocus amount. For example, technology for detecting AF area in which a main subject exists based on defocus amount is disclosed in Japanese patent laid open number 2007-199261 (hereafter referred to as patent publication 1). Also, technology that prevents an AF area in which deviation in defocus amount is large from being selected due to being an AF area in which a main subject does not exist, has been proposed in Japanese patent laid-open number 2015-087706 (hereafter referred to as patent publication 2).

With a subject that is mix of near and far objects, it is not necessarily possible to appropriately select an AF area with the technology that is disclosed in the patent publications 1 and 2 described above. For example, when a photographer wants to take a photograph of a subject at the near side, there may be cases where AF is performed on a background which is at the infinity end.

SUMMARY OF THE INVENTION

The present invention provides a focus adjustment device and focus adjustment method that can select an appropriate autofocus (AF) area in order to focus on a main subject.

A focus adjustment device of a first aspect of the present invention, that is provided with a plurality of AF areas, repeatedly detects defocus amount for the AF areas, and performs adjustment of focus position by selecting an AF area based on the defocus amount, comprises a processor having a range setting section, conversion section, reference setting section, reference sitting section, range selection section, reference update section, and area selection section, wherein the range setting section sets a first range including at least one of the AF areas, or a second range including the first range, the conversion section converts each of a plurality of the defocus amounts that have been repeatedly detected to calculate a plurality of focus target positions, the reference setting section sets a focus position at a specified time point to a reference position, the range selection section, every time the defocus amount is detected, selects the first range or the second range based on a focus target position and the reference position of an AF area included in the first range and an AF area included in the second range, the reference update section, every time the defocus amount is detected, updates the reference position based on the plurality of focus target positions of AF areas included in the range that has been selected and the reference position, and the area selection section, every time the defocus amount is detected, selects an AF area used in the adjustment from the plurality of AF areas, based on the plurality of focus target positions of AF areas included in the range that has been selected, and the reference position that has been updated.

A focus adjustment method of a second aspect of the present invention, is a focus adjustment method for a focus adjustment device that is provided with a plurality of AF areas, repeatedly detects defocus amount for the AF areas, and performs adjustment of focus position by selecting an AF area based on the defocus amount, and the focus adjustment method comprises setting a first range including at least one of the AF areas, or a second range including the first range, converting each of a plurality of the defocus amounts that have been repeatedly detected to calculate a plurality of focus target positions, setting a focus position at a specified time point to the reference position, every time the defocus amount is detected, selecting the first range or the second range based on an AF area included in the first range, the focus target position of an AF area included in the second range, and the reference position, every time the defocus amount is detected, updating the reference position based on the plurality of focus target positions of AF areas included in the range that has been selected, and the reference position, and every time the defocus amount is calculated, selecting an AF area used in the adjustment from the plurality of AF areas, based on the plurality of focus target positions of AF areas included in the range that has been selected, and the reference position that has been updated.

A non-transitory computer-readable medium of a third aspect of the present invention, storing a processor executable code, which when executed by at least one processor, performs a focus adjusting method, the one processor being provided in a focus adjustment device, the focus adjustment device being provided with a plurality of AF areas, repeatedly detecting defocus amount for the AF areas, and performing adjustment of focus position by selecting an AF area based on the defocus amount, the focus adjusting method comprising setting a first range including at least one of the AF areas, or a second range including the first range, converting each of a plurality of the defocus amounts that have been repeatedly detected to calculate a plurality of focus target positions, setting a focus position at a specified time point to the reference position, every time the defocus amount is detected, selecting the first range or the second range based on an AF area included in the first range, the focus target position of an AF area included in the second range, and the reference position, every time the defocus amount is detected, updating the reference position based on the plurality of focus target positions of AF areas included in the range that has been selected, and the reference position, and every time the defocus amount is calculated, selecting an AF area used in the adjustment from the plurality of AF areas, based on the plurality of focus target positions of AF areas included in the range that has been selected, and the reference position that has been updated.

BRIEF DESCRIPTION OF THE DRAWINGS

FIG. 2A to FIG. 2C are flowcharts showing one example of focus adjustment device control processing of one embodiment of the present invention.

FIG. 3 is a flowchart showing one example of control processing for a second time center priority 1R, of one embodiment of the present invention.

DETAILED DESCRIPTION OF THE PREFERRED EMBODIMENTS

An example where a digital camera is adopted as a focus adjustment device of one embodiment of the present invention will be described in the following. This digital camera has an imaging section, with a subject image being converted to image data by this imaging section, and the subject image being subjected to live view display on a display section etc. arranged on the rear surface of the camera body based on this converted image data. A photographer determines composition and photo opportunity by looking at the live view display. At the time of a release operation image data is stored in a storage medium. Image data that has been stored in the storage medium can be subjected to playback display on the display section etc. if playback mode is selected.

Also, the focus adjustment device of this embodiment is provided with a plurality of AF areas, repeatedly detects defocus amount for these AF areas, and performs adjustment of focus position by selecting AF area based on the defocus amount. Also, with this embodiment, among AF areas that have been set, there is division into at least a first priority range and a second priority range (for example, S71 in S3), and together with updating a reference position based on a focus target position of an AF area that is included in a range that has been selected and a reference position (for example, S75, S81 and S85 in FIG. 3), an area for performing AF, within a priority range that has been selected, is selected (refer, for example, to S77, S83 and S87 in FIG. 3).

<<Structure Of Focus Adjustment Device>

Figure 1:
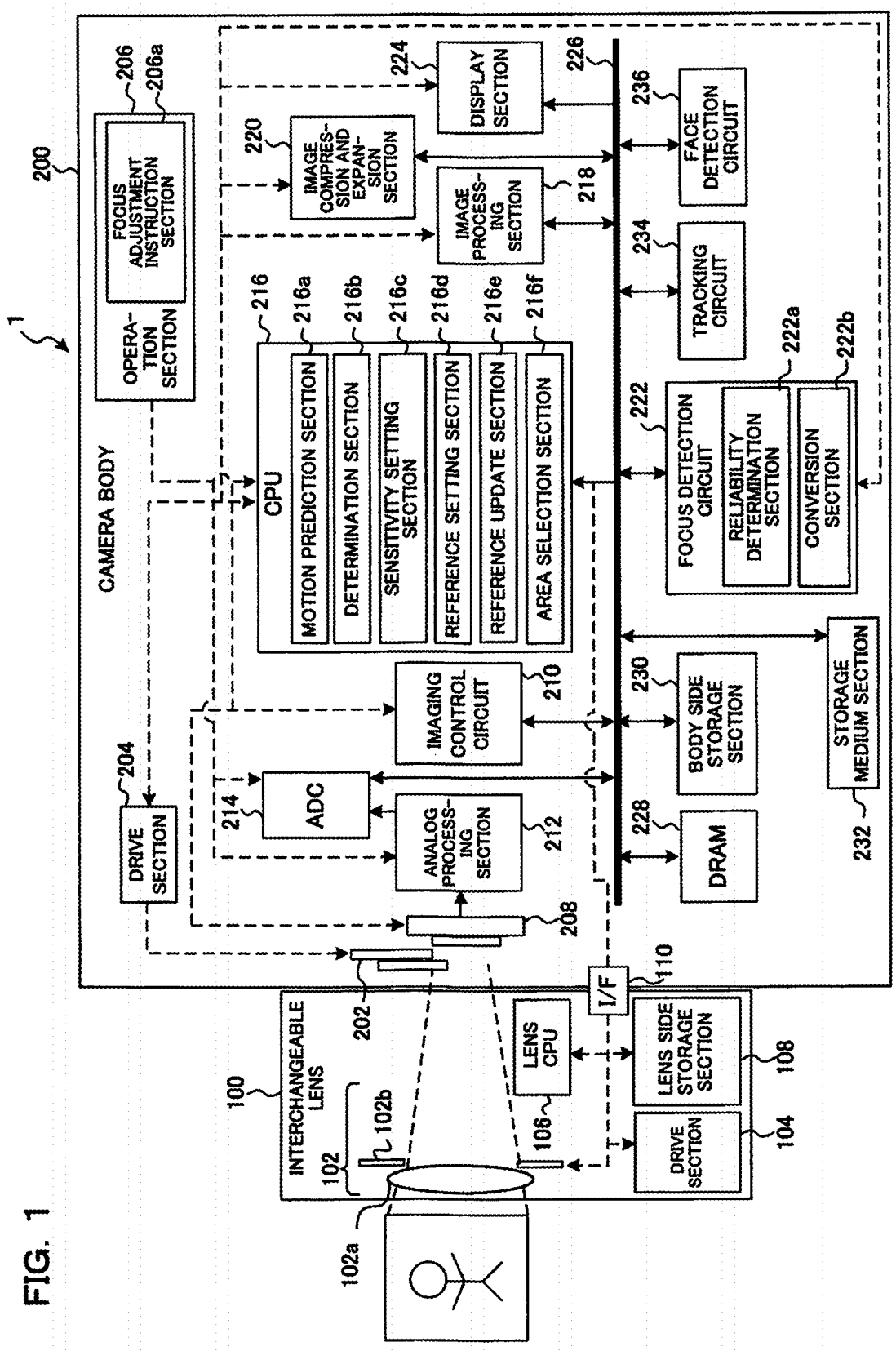
FIG. 1 is a block diagram showing one example of the structure of a focus adjustment device 1 of one embodiment of the present invention.

The structure of a focus adjustment device 1 of this embodiment will first be described with reference to the drawings. FIG. 1 is a block diagram showing one example of the structure of a focus adjustment device 1 of this embodiment. It should be noted that this focus adjustment device 1 is one example of an imaging device, and is also one example of a camera system. It should be noted that in FIG. 1 solid line arrows show flow of data, and dashed line arrows show flow of control signals.

The focus adjustment device 1 of this embodiment is a focus adjustment device that can select an appropriate autofocus (AF) area in order to focus on a main subject. As shown in FIG. 1, the focus adjustment device 1 is a camera system provided with an interchangeable lens 100 and a camera body 200. The interchangeable lens 100 is configured so that it is possible to attach to the camera body 200. When the interchangeable lens 100 is attached to the camera body 200, the interchangeable lens 100 and the camera body 200 are connected so that communication is possible between them. It should be noted that the focus adjustment device 1 need not necessarily be an interchangeable lens type camera system. For example, the focus adjustment device 1 may be an integrated lens type camera system.

The interchangeable lens 100 comprises a photographing lens 102, a drive section 104, a lens CPU (Central Processing Unit) 106, and a lens side storage section 108.

The photographing lens 102 is an optical system for forming subject light flux into an image on an image plane of an image sensor 208 within the camera body 200. The photographing lens 102 comprises a focus lens 102a and an aperture 102b. The focus lens 102a is configured so as to be able to adjust focal position of the photographing lens 102 by moving in the optical axis direction. Besides the focus lens 102a, the photographing lens 102 may also have an optical lens such as a zoom lens for varying focal length. The aperture 102b is arranged on the optical axis of the focus lens 102a. The opening diameter of the aperture 102b is variable. The aperture 102b adjusts amount of subject light flux passing through the focus lens 102a that is incident on the image sensor 208.

The drive section 104 has a lens drive mechanism, aperture drive mechanism, lens drive circuit and aperture drive circuit etc., and drives the focus lens 102a and aperture 102b based on control signals that have been output from the lens CPU 106. The drive section 104 moves the focus lens 102a in the optical axis direction. Here, the photographing lens 102 may also be a zoom lens, as described previously, and in this case the drive section 104 may also perform zoom drive.

The lens CPU 106 is a processor having a CPU etc., and performs overall control within the interchangeable lens 100 in accordance with program that have been stored in the lens side storage section 108. The lens CPU 106 is configured so as to achieve communication with the CPU 216 of the camera body 200. Communication between the lens CPU 106 and the camera body 200 is performed via an interface (I/F) 110 as a lens communication section. The lens CPU 106 has a function as a focus control section. The drive section 104 performs focus operation in accordance with control by the CPU 216 or the lens CPU 106. The lens CPU 106 transmits various information within the interchangeable lens 100 to the CPU 216 via the I/F 110. The various information includes, for example, aperture value (F value) of the aperture 102b, lens information stored in the lens side storage section 108, and current lens pulse position. The lens side storage section 108 is an electrically rewritable non-volatile memory, and stores information relating to the interchangeable lens 100. Lens information includes, for example, focal length information and aberration information of the photographing lens 102.

The camera body 200 comprises a mechanical shutter 202, a drive section 204, an operation section 206, the image sensor 208, an imaging control circuit 210, an analog processing section 212, an analog to digital conversion section (ADC) 214, the CPU 216, an image processing circuit 218, an image compression and expansion section 220, a focus detection circuit 222, a display section 224, a bus 226, DRAM (Dynamic Random Access Memory) 228, a body side storage section 230, a storage medium 232, a tracking circuit 234, and a face detection circuit 236.

The mechanical shutter 202 is arranged on the optical axis of the focus lens 102a, and is configured so as to open and close. The mechanical shutter 202 adjusts time that subject light flux from a subject is incident on the image sensor 208. Subject light flux incident time is exposure time of the image sensor 208, for example. A focal plane shutter, for example, is adopted as the mechanical shutter 202. The drive section 204 drives the mechanical shutter 202 based on control signals from the CPU 216.

The operation section 206 is provided with a focus adjustment instruction section 206a, and is an input interface for the user to input instructions. The focus adjustment instruction section 206a is a release button, for example. The focus adjustment instruction section 206a outputs control signals to cause commencement of focusing in response to operation of 1st release etc. by the user. Specifically, the focus adjustment instruction section 206a issues a commencement instruction for focus adjustment. The operation section 206 includes various operation buttons such as a power supply button, movie button, playback button, menu button, and shooting mode setting dial, and various operation members such as an operation dial and a touch panel etc. The operation section 206 detects operating state of the various operation members, and outputs signals representing detection results to the CPU 216.

The image sensor 208 is arranged on the optical axis of the photographing lens 102. The image sensor 208 is arranged behind the mechanical shutter 202, and close to a position where subject light flux is made into an image by the photographing lens 102. The image sensor 208 is made up of light receiving sections, comprising pixels, arranged two dimensionally. A light receiving section is, for example a photodiode. Light receiving sections constituting the image sensor 208 generate electric charge in accordance with the amount of light received. Electric charge that has been generated by a light receiving section is accumulated in a capacitor that is connected to each light receiving section. Electric charge that has been accumulated in this capacitor is read out as a pixel signal, in accordance with control signals from the imaging control circuit 210. Here, the image sensor 208 may have focus detection pixels for phase difference detection.

The imaging control circuit 210 controls exposure of the image sensor 208. The imaging control circuit 210 controls readout of pixel signals from the image sensor 208. These controls are performed in accordance with settings for readout of pixel signals the image sensor 208.

The analog processing section 212 has an analog processing circuit, and acquires pixel signals that have been read out from the image sensor 208 in accordance with control by the imaging control circuit 210. The analog processing section 212 performs analog processing, such as amplification processing, on the pixel signals. The analog processing section 212 outputs pixel signals after processing to the ADC (Analog-to-digital Converter) 214. The ADC 214 converts pixel signals that have been output from the analog processing section 212 to digital format pixel data. It should be noted that in the following description grouping of pixel data will be called image data.

The CPU 216 is a processor having a CPU etc., and is a control section that performs overall control of the focus adjustment device 1. These controls are performed in accordance with programs that are stored in the body side storage section 230 etc. The CPU 216 functions as a motion prediction section 216a, a determination section 216b, a sensitivity setting section 216c, a reference setting section 216d, a reference update section 216e, and an area selection section 216f. The CPU 216 functions as at least one processor having a range setting section, a conversion section, a reference setting section, a range selection section, a reference update section, and an area selection section. It should be noted that the function of the conversion section, for calculating a plurality of focus target positions by converting each of a plurality of repeatedly detected defocus amounts, is fulfilled by the conversion section 222b within the focus detection circuit 222, but this is not limiting, and the function of the conversion section may be fulfilled by the CPU 216. Also, the CPU 216 and the focus detection circuit 222 may also be a processor that performs the functions of a range setting section, a conversion section, a reference setting section, a range selection section, a reference update section, and an area selection section. Specifically, the processor is not limited to being a single unit, and there may be a plurality of processors.

The motion prediction section 216a, calculates a motion prediction formula for predicting subject position after a predetermined time based on a history of a plurality of repeatedly detected defocus amounts. This history includes history of previous ranging results stored by the DRAM 228, for example. Ranging results are information relating to defocus amount and drive position of the focus lens 102a, for example. Specifically, the motion prediction formula may be a relational expression for defocus amount and time, or may be a relational expression for lens pulse position and time. The motion prediction formula may also be a relational expression for accumulated value of defocus amount and time. It should be noted that a plurality of the defocus amounts are repeatedly detected by the focus detection circuit 222, for example, which will be described later.

The determination section 216b performs first determination to determine whether or not a motion prediction formula is established. The determination section 216b also performs second determination to determine whether a drive direction of the focus lens 102a obtained from the motion prediction formula is the close-up direction or the infinity direction. The second determination can be expressed as a determination as to whether gradient of the motion prediction formula, when the horizontal axis is lens position and the vertical axis is time, is positive or negative. Here, when drive direction of the focus lens 102a is the close-up direction the gradient of the motion prediction formula is positive. Also, when drive direction of the focus lens 102a is the infinity direction the gradient of the motion prediction formula is negative.

It should be noted that with the description of this embodiment, defocus amount being positive represents that focus deviation direction for a given focus deviation amount is in the close-up direction. However, it goes without saying that whether motion prediction formula, gradient of the defocus amount, etc. are positive or negative may change depending on which of the lens drive directions, for example, is made a positive direction. Also, although described in detail later, the determination section 216b also performs third determination to determine whether, among the plurality of defocus amounts that have been detected, a defocus amount exists that is a minimum absolute value of positive defocus amount and also smaller than a specified factor of an absolute value of negative defocus amount, or if positive defocus amount is sufficiently small.

The determination section 216b may also perform evaluation relating to precision of the motion prediction formula. This evaluation is evaluation such as to what extent the calculated motion prediction formula is in line with the history information for defocus amount. Precision of a motion prediction formula that has been evaluated in this way can also be expressed as, for example, reliability of the motion prediction formula, probability of the motion prediction formula etc.

The sensitivity setting section 216c sets sensitivity of focus adjustment. For example, when the user wishes to track AF on a subject that is moving sharply, such as with abrupt acceleration or abrupt deceleration, high sensitivity would be set. For the sensitivity, a plurality of predetermined values may be prepared, such as selectable levels like "high" "standard", and "low", and it may also be possible for the user to set to an arbitrary value.

The reference setting section 216d acquires lens pulse position of the focus lens 102a for particular time point. Lens pulse position of the focus lens 102a is acquired from the focus detection circuit 222. At a particular time point includes, for example, commencement time for continuous shooting with continuous AF (C-AF) where AF and in-focus are repeated by focusing on a subject that is moving. In the following, continuous shooting with C-AF will be described as C-AF continuous shooting. At a particular time point may also include commencement time of shooting for LV while 1st release is held. The reference setting section 216d sets the lens pulse position that has been acquired as a reference position. The reference setting section 216d functions as a reference setting section that sets focus position at a particular time point to a reference position (refer, for example, to S37 in FIG. 2B).

The reference update section 216e performs update determination to determine whether or not to update the reference position, in reference determination processing to determine reference position. The reference update section 216e determines reference position after update determination, based on result of update determination. The reference update section 216e functions as a reference update section that updates reference position based on a plurality of focus target positions of AF areas contained in a range that has been selected, and reference position, every time defocus amount is detected (refer, for example, to S37 in FIG. 2B). The reference update section updates reference position in a case where a difference between the reference position and a focus target position that is closest to the reference position, among focus target positions of AF areas contained in a first range, is within a third specified range (refer, for example, to S75 in FIG. 3). The reference update section updates a focus target position that is at the closest range, or at the second closest range, as a reference position (refer, for example, to FIG. 20). The reference update section updates reference position when a difference between the reference position and a focus target position that is closest to the reference position is repeatedly within the third specified range continuously for a given number of times (refer to S75 in FIG. 3).

The area selection section 216f selects an AF area used in adjustment of focus position, from a plurality of AF areas. Selection of AF area in first area selection processing and second area selection processing is based on defocus amount. Selection of AF area in third area selection processing is based on focus target position and reference position. Here, focus target position is a lens pulse position calculated based on defocus amount. Focus target position is target position at the time of moving the focus lens 102a, and so can also be expressed as lens target position. Selection of AF area for second area selection processing and third area selection processing is further based on whether or not a motion prediction formula has been established, and gradient of the motion prediction formula.

Figure 2A:
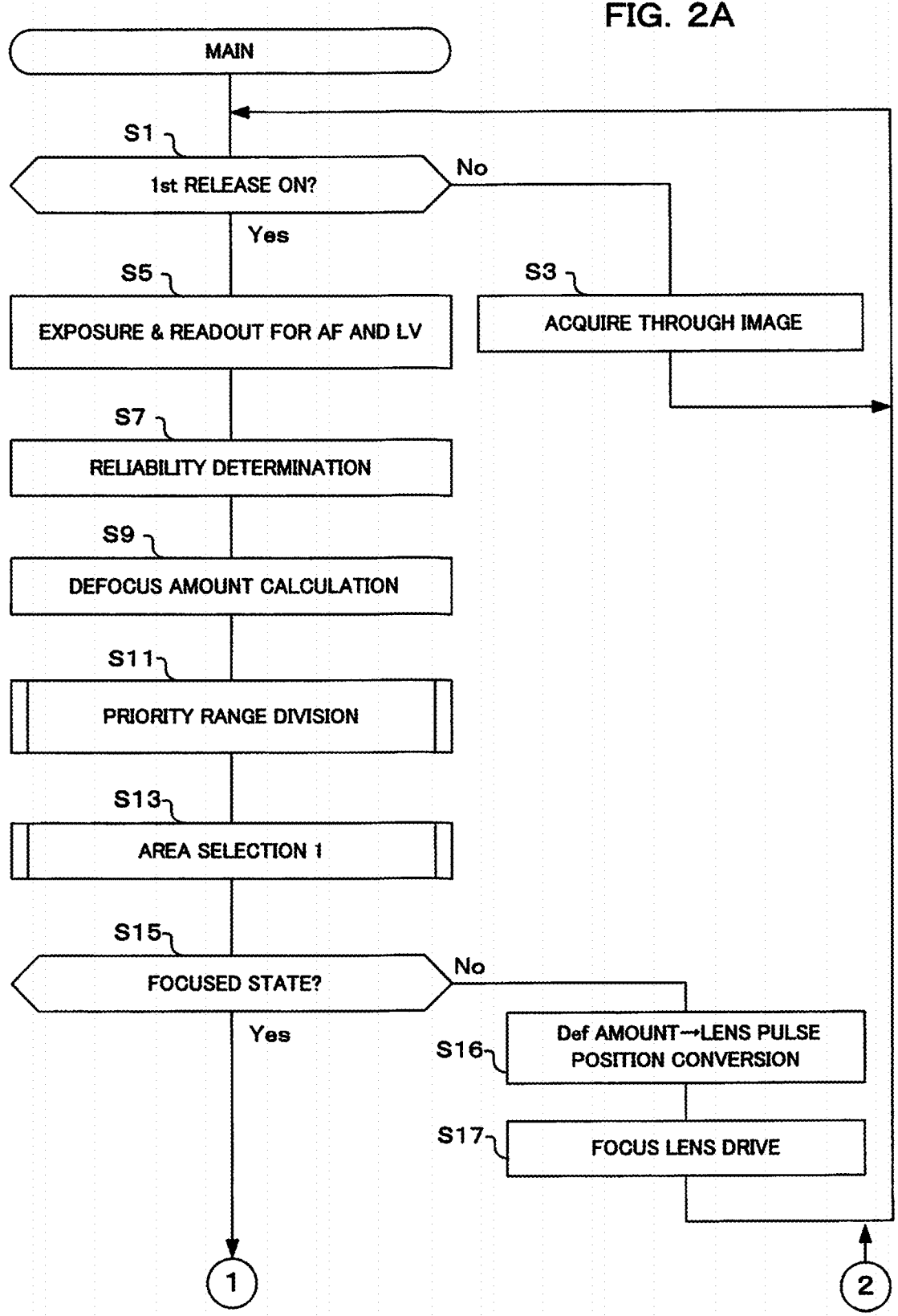

The area selection section 216f functions as a range setting section that sets a first range that contains at least one AF area, or a second range that contains the first range (refer, for example, to S11 in FIG. 2A). The area selection section 216f functions as a range selection section that, every time defocus amount is detected, selects the first range or the second range based on an AF area included in the first range, the focus target position of an AF area included in the second range, and the reference position (refer, for example, to S35 in FIG. 2B). The area selection section 216f functions as an area selection section that, every time defocus amount is detected, selects an AF area used in adjustment from a plurality of AF areas, based on a plurality of focus target positions of AF areas included in the range that has been selected, and the reference position that has been updated (refer, for example, to S39 in FIG. 2B).

The above described range selection section selects the first range when a difference between a focus target position of and AF area included in the first range, and a reference position, is within a first specified range (refer, for example, to S73 Yes in FIG. 3). The range selection section selects the second range when a difference between a focus target position of an AF area included in the first range, and a reference position, is not within a first specified range (refer, for example, to S79 Yes in FIG. 3). The range selection section selects the second range in the event that there is one AF area included in the first range and a difference between the reference position and the focus target position of the AF area is not within the first specified range, and a difference between the reference position and a focus target position of an AF area included in the second range is within a second specified range (refer, for example, to S79 Yes in FIG. 3).

The above described range selection section sets a third range that contains the second range in the event that a difference between reference position and focus target position of an AF area that is contained in the second range is not within the second specified range, and the area selection section selects AF area based on a reference position that has been updated and focus target position of an AF area that is contained in the third range (refer, for example, to S79 No in FIG. 3). The area selection section selects an AF area within the first range reference position in a case where a difference between the reference position and a focus target position that is closest to the reference position, among focus target positions of AF areas contained in the first range, is within the third specified range (refer, for example, to S77 in FIG. 3). The area selection section selects an AF area, among AF areas within the first range, indicating a focus target position that is closest to the reference position (refer, for example, to S83 in FIG. 3).

The image processing circuit 218 has an image processing circuit, and applies various image processing to image data. The image processing circuit 218 applies image processing for still picture storage when storing still pictures. The image processing circuit 218 applies image processing for movie storage when storing movies. The image processing circuit 218 applies image processing for LV display when performing live view (LV) display.

The image compression and expansion section 220 has an image compression and expansion circuit, and performs compression and expansion of image data. Image data may be still image data and may also be image data included in movie image data. The image compression and expansion section 220 compresses image data that has been generated by the image processing section 218, at the time of storage of image data. At the time of image data playback, the image compression and expansion section 220 expands image data that is stored in the storage medium 232 in a compressed state.

The focus detection circuit 222 performs defocus amount calculation in order to calculate defocus amount for in-focus position of the focus lens 102a. Defocus amount represents focus deviation direction and focus deviation amount. The focus detection circuit 222 acquires pixel data of focus detection pixels, in the event that focus detection pixels are provided in the image sensor 208. The focus detection circuit 222 calculates defocus amount for in-focus position of the focus lens 102a using a known phase difference method, based on pixel data that has been acquired.

In the following description, description will be given of the focus detection circuit 222 detecting defocus amount with a phase difference method using focus detection pixels that are arranged on the image plane of the image sensor 208. However, the focus detection circuit 222 may also detect defocus amount with various methods besides a phase difference method that uses focus detection pixels. For example, the focus detection circuit 222 may detect defocus amount from pairs of image data that have been output from a ranging sensor that is separate from focus detection pixels.

The focus detection circuit 222 has the functions of a reliability determination section 222a and the conversion section 222b. The reliability determination section 222a determines reliability relating to detection of defocus amount. For example, the reliability determination section 222a performs reliability determination of two-image interval value. The conversion section 222b calculates focus target position based on defocus amount that has been calculated. The conversion section 222b functions as a conversion section that converts each of a plurality of the defocus amounts that have been repeatedly detected to calculate a plurality of focus target positions (refer to S33 in FIG. 2B etc.). Here, a focus target position is a lens pulse position that the focus lens 102a should be driven to. It should be noted that defocus amount is a relative position with respect to current position of the focus lens 102a. On the other hand, focus target position is an absolute position. It should be noted that the functions as the reliability determination section 222a and/or the conversion section 222b may also be executed using the CPU 216.

The display section 224 is a display such as a liquid crystal display or organic EL display, for example. The display section 224 is arranged on the rear surface of the camera body 200, for example. The display section 224 may also be an electronic viewfinder (EVF) with which a monitor can be observed by means of an eyepiece. The focus adjustment device 1 may have a display section arranged on a rear surface as well as being provided with an EVF, or may have either one. The display section 224 displays images in accordance with control by the CPU 216. The display section 224 is used in live view (LV) display and display of already stored images etc.

The bus 226 is connected to the imaging control circuit 210, ADC 214, CPU 216, image processing section 218, image compression and expansion section 220, focus detection circuit 222, display section 224, DRAM (Random Access Memory) 228, body side storage section 230, storage medium 232, tracking circuit 234, and face detection circuit 236. The bus 226 functions as a transfer path for transferring various data that has been generated in these blocks.

The DRAM 228 is an electrically rewritable memory. The DRAM 228 temporarily stores various data such as the previously described image data (pixel data), image data for storage, image data for display, and processed data of the CPU 216. It should be noted that it is also possible to use an SDRAM (synchronous dynamic random access memory) as a storage circuit for temporary storage.

The body side storage section 230 is a rewritable non-volatile memory, and stores various data such as programs used by the CPU 216 and adjustment values for the camera body 200 etc. The storage medium 232 stores image data for storage as an image file of a specified format. The storage medium 232 may be configured so as to be built into the camera body 200, or may be configured so that it can be loaded into and removed from the camera body 200 camera body 200. It should be noted that the DRAM 228, body side storage section 230, and storage medium 232 may be respectively configured as a single memory, or may be configured as a combination of a plurality of memories etc. Also, the DRAM 228 and the body side storage section 230 may be configured as a single memory etc.

The tracking circuit 234 tracks a moving subject such as a child or pet that is moving. The face detection circuit 236 detects whether or not a face is included in the subject. In the event that the subject includes a face, the face detection circuit 236 further detects what position the face at within an angle of view. In the following, a region that includes a face that has been detected by the face detection circuit 236 in this embodiment will be described as a face detection range. The face detection circuit 236 is also provided with a pupil detection circuit. The pupil detection circuit detects whether or not there is a pupil within the face detection range that has been detected by the face detection circuit 236, and position of the pupil etc.

It should be noted that although the lens CPU 106 and CPU 216 are a Central Processing Unit (CPU), they may also be integrated circuits, such as an Application Specific Integrated Circuit (ASIC), Field Programmable Gate Array (FPGA), Digital Signal Processor (DSP), or Graphics Processing Unit (GPU). The lens CPU 106 and the CPU 216 may be respectively constituted by a single integrated circuit, or may be constructed with a combination of a plurality of integrated circuits etc. Operation of these integrated circuits etc. is performed in accordance with programs that have been stored in the lens side storage section 108, body side storage section 230, or a storage region of the integrated circuits, for example.

<<Operation Of Focus Adjustment Device>

Figure 2B:
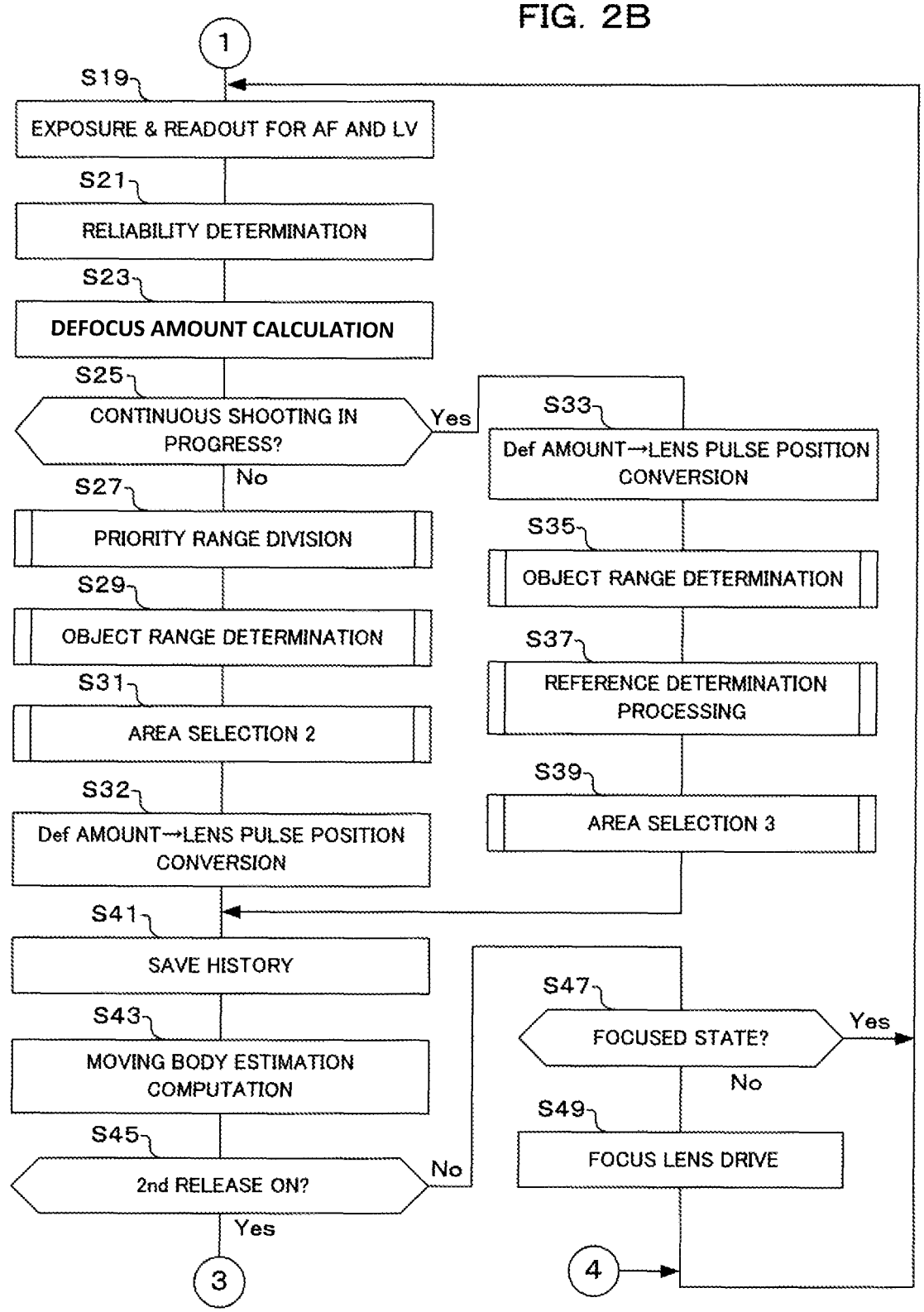

Next, the operation of a focus adjustment device 1 of this embodiment will be described with reference to the drawings. FIG. 2A to FIG. 2C are flowcharts showing one example of control processing executed by the focus adjustment device 1 of this embodiment. If the user operates a power supply switch of the operation section 206, the power supply of the camera is turned on, and the main flow shown in FIG. 2A commences operation. It should be noted that the main flow shown in FIG. 2A to FIG. 2C mainly describes focus adjustment operation, and description for other operations is omitted.

If the main flow of FIG. 2A commences operation, first, the CPU 216 determines whether or not the 1st release switch is in an on state (S1). This determination is performed based on operation signals that are output by the focus adjustment instruction section 206a in accordance with user operation, for example. The 1st release switch is a switch that is put in an on state in response to a half press operation of a release button by the user, for example. Processing advances to step S5 if it has been determined that the 1st release switch is in an on state, and advances to step S3 if an on state is not determined.

If the result of determination in step S1 is that the 1st release switch is not on, acquisition of a live view (LV) image (called "through image") is performed (S3). In this step, the CPU 216 acquires image data for live view display. The CPU 216 switches control signals of the drive section 204 so as to put the mechanical shutter 202 in a fully open state. The CPU 216 outputs control signals to the lens CPU 106 so as to drive the aperture 102b. The CPU 216 commences an exposure operation for LV display using the image sensor 208 after the lapse of a predetermined time from the aperture 102b being open, and the mechanical shutter 202 being in a fully open state.

Frame rate of the exposure operation for LV display in step S3 is, for example, 60 fps (frames per second). The image processing circuit 218 performs correction processing on pixel data from the focus detection pixels. As a result of this correction processing, it becomes possible to use pixel data from the focus detection pixels in LV display similarly to pixel data from imaging pixels. After this correction processing, the image processing circuit 218 performs other processing necessary for generation of image data for LV display. After these various processes, the image processing circuit 218 generates image data for display. The CPU 216 displays image data for display on the display section 224. After that, processing returns to step S1.

The processing relating to LV image acquisition on LV display in step S3 is performed repeatedly until it is determined, in step S1, that the 1st release switch is in an on state. It should be noted that when it has been detected that the user has performed an operation to turn the camera power supply off, and when a specified time has elapsed with it not having been determined that the 1st release switch is in an on state, processing may advance to step S61.

If the result of determination in step S1 is that it has been determined that the 1st release switch is on, exposure for AF/LV is performed, and readout of image data is performed (S5). In this step, the CPU 216 first commences an exposure operation for AF using the image sensor 208. Exposure time for the exposure operation for AF may be different to the exposure time for the exposure operation for LV display. The CPU 216 performs readout of image data once the exposure time has elapsed. Also, in the exposure operation for AF, pixel signals may be read out from only focus detection pixels.

Once readout of image data has been performed, next reliability determination is performed (S7). In this step, the reliability determination section 222a performs reliability determination of a two-image interval value. Details of the reliability determination will be described later (refer to the section entitled <Regarding Reliability Determination>). With this embodiment, it is assumed that processing subsequent to step S7 will be executed for AF area A1 for which it is has been determined that all three conditions for reliability determination, which will be described later, are satisfied. It should be noted that the description here does not exclude a situation where subsequent processing is performed for AF area A1 for which all three of the determination conditions are not satisfied.

Once reliability determination has been performed, next defocus amount is calculated (S9). In this step, the focus detection circuit 222 detects defocus amount for in-focus position of the focus lens 102a. With this embodiment, defocus amount is detected for focus detection area B0 (refer to FIG. 6A and FIG. 6B) that has been designated by the user. However, this is not limiting, and defocus amount may also be detected for AF areas A1 around the focus detection area B0 (refer to FIG. 4), and defocus amount may also be detected for all AF areas A1 within the overall AF area A0.

Detection of defocus amount may be expressed as calculation of defocus amount. Defocus amount represents focus deviation direction and focus deviation amount. Calculation of defocus amount is performed based on a known phase difference method that uses pixel data that has been acquired from focus detection pixels. The focus detection circuit 222 calculates defocus amount by multiplying a sensitivity value that is different for every AF area by a two-image interval value of each AF area A1. Here, the two-image interval value is a value of image shift amount that represents a correlation calculation result which is a minimum value. Defocus amount is calculated as a value with mm units, for example. Also, the focus detection circuit 222 adds best contrast deviation correction amount of the photographing lens 102 to the defocus amount. Here, contrast best deviation correction amount of the photographing lens 102 can be expressed as optical correction amount. Optical correction amount is different for each AF area A1. Optical correction amount is substantially a frequency deviation amount of the photographing lens 102. It should be noted that the optical correction amount is stored in the body side storage section 230, for example.

Once defocus amount has been calculated, next, division of priority ranges is performed (S11). The user can set a focus detection area that is made up of one or a plurality of AF areas A1, from within the AF area A0 (refer to FIG. 4), by operating the operation section 206. In this step, the CPU 216 divides a focus detection range (area) that has been designated by the user into a first priority range (area), a second priority range (area), and a third priority range (area). Division of priority ranges will be described later using FIG. 6A and FIG. 6B.

Once priority range division has been performed, next area selection 1 is performed (S13). In this step, the CPU 216 selects an AF area indicating a defocus amount that is at the closest range, based on the value for defocus amount that was calculated in step S9. Also, first area selection processing is executed in the period once after 1st release has been pressed down, until temporary in-focus determination is performed. Details of the first area selection processing will be described later (refer to the section entitled <First Area Selection Processing>).

If area selection 1 has been performed, it is next determined whether or not there is a focused state (S15). In this step, whether or not there is a focused state is determined by the CPU 216 based on whether or not defocus amount is within a predetermined permissible range, for example. Details of this determination will be described later (refer to the section entitled "Focused State (Within Focusing Range)").

If the result of determination in step S15 is that there is not a focused state, the focus detection circuit 222 performs processing to convert defocus amount that is output for the AF area that was selected in the first area selection processing to a focus target position (S16). Focus target position is lens pulse position. Details of this processing will be described later (refer to the section entitled "Conversion Of Defocus Amount To Lens Pulse Position").

Next, the focus lens is driven based on the focus target position that has been calculated (S17). In order to do this, the CPU 216 generates control signals for driving the focus lens 102a. The control signals that have been generated are output to the lens CPU 106. Control signals are signals for moving the focus lens 102a to a focus target position that corresponds to the AF area selected by the first area selection processing. The lens CPU 106 operates the drive section 104 based on control signals that have been acquired. The drive section 104 drives the focus lens 102a. Once the focus lens has been driven processing returns to step S1.

If the result of determination in step S15 is a focused state, exposure for AF/LV is performed, and readout of image data is performed (S19). In this step, the CPU 216 commences an exposure operation for AF and LV, and reads out pixel signals, similarly to the processing of step S5. Once an image signal has been read out, reliability determination is performed (S21). In this step, the reliability determination section 222a performs reliability determination for a two-image interval value, similarly to the processing of step S7. Next, calculation of defocus amount is performed (S23). In this step, the focus detection circuit 222 calculates defocus amount, similarly to the processing of step S9.

Once a defocus amount has been calculated, it is next determined whether or not continuous shooting is in progress (S25). When taking pictures using continuous shooting, the user sets continuous shooting mode using the operation section 206, and further, performs shooting by keeping the release button in a fully pressed down state (second release on). In this step, the CPU 216 determines whether or not continuous shooting is in progress based on the shooting mode and the operating state of the release button.

If the result of determination in step S25 is that continuous shooting is not in progress, namely that continuous shooting mode is not set, or if there is not a fully depressed state even if continuous shooting mode has been set, next division of priority range is performed (S27). In this step, the CPU 216 divides a focus detection range (area) that has been designated by the user into a first priority range (area), a second priority range (area), and a third priority range (area), similarly to step S11 (refer to FIG. 6A and FIG. 6B).

Once division of priority range has been performed, next target range (object range) is determined (S29). In this step the CPU 216 determines, based on the priority ranges that have been divided in step S27, whether a range in which focus detection will be performed will be only the first priority range, only the first and the second priority ranges, or the first, second and third priority ranges. These first, second, and third priority ranges will be described later using FIG. 6A and FIG. 6B (refer also to the description in the section entitled "Target Range Determination").

Once determination of target range for focus detection has been determined, next area selection 2 is performed (S31). In this step, the CPU 216 performs second area selection processing, within the target range for focus detection that was determined in step S29. This processing is executed once after focus has been achieved on a main subject, that is, while the 1st release is being held on. Details of the second area selection processing will described later (refer to the section entitled <Second Area Selection Processing>).

Once area selection 2 has been performed, next the defocus amount is converted to a lens pulse position (S32). Here, the focus detection circuit 222 performs processing to convert the defocus amount to a focus target position, similarly to the processing of step S16. In this step processing is performed for defocus amount that is output for an AF area that was selected by the second area selection processing. The focus target position that has been calculated in this step is used in the moving body estimation computation (motion prediction) of step S43, and the focus lens drive of step S49 or step S53.

Next, history saving is performed (S41). In this step, the CPU 216 stores history information used in moving body estimation computation to the DRAM 228, for example. History information includes, for example, defocus amount that is output for the AF area that was selected in the second area selection processing, and focus target position corresponding to the AF area that was selected in the second area selection processing. During continuous shooting steps S33 to S39 are executed, and at this time defocus amount and focus target position are calculated, and so these items of information are stored in association with time information, as history information.

Once history information has been saved, moving body estimation computation is performed (S43). In this step, the motion prediction section 216a performs moving body estimation computation. Moving body estimation computation is processing to predict position that the focus lens 102a should be moved to at this time, from history of previous ranging results. Ranging results are drive positions of the focus lens 102a.

Once moving body estimation computation has been performed, it is next determined whether or not the 2nd release switch is on (S45). In this step, the CPU 216 determines whether or not the 2nd release switch of the operation section 206 has been turned on. The 2nd release switch is a switch that is turned on in response to a full press operation of a release button by the user, for example. Processing advances to step S47 if it has been determined that the 2nd release switch has not been turned on, while processing advances to step S51 if it has been determined that the 2nd release switch has been turned on. It should be noted that when it has not been determined that the 2nd release switch is on, it may be determined whether or not the 1st release switch is on before the processing of step S47. In this case, processing advances to step S47 if it has been determined that the 1st release switch is on, and advances to step S61 if an on state is not determined.

If the result of determination in step S45 is that the 2nd release switch is not on, it is determined whether or not there is a focused state (S47). In this step, the CPU 216 determines whether or not the focus lens 102a is in a focused state, similarly to step S15. Details of this determination will be described later (refer to the section entitled "Determination Of Whether Or Not There Is A Focused State (Within Focusing Range)"). If the result of this determination is a focused state, processing returns to step S19.

On the other hand, if the result of determination in step S47 is not a focused state, the focus lens is driven (S49). In this step, the CPU 216 drives the focus lens, similarly to step S17. It should be noted that in this step conversion of the defocus amount to lens pulse position may also be performed. Once the focus lens has been driven processing returns to step S19.

If the result of determination in step S45 is that the 2nd release switch is on, a shutter operation is commenced (S51). In this step, the CPU 216 commences operation of the mechanical shutter 202 in order to perform actual exposure for still picture continuous shooting. This operation of the mechanical shutter 202 includes opening and closing operations of the mechanical shutter 202 before and after actual exposure, and a fully open operation of the mechanical shutter 202 after actual exposure in order to commence an exposure operation for live view and AF. The CPU 216 first switches control signals of the drive section 204 so as to put the mechanical shutter 202 in a fully closed state. Then, after actual exposure has been performed in step S55, the CPU 216 controls the drive section 204 so as to put the mechanical shutter 202 in a fully open state.

Once the shutter operation has been commenced, simultaneous drive of the aperture and the focus lens is commenced (S53). In this step, the CPU 216 instructs the lens CPU 106 so as simultaneously drive the focus lens 102a and the aperture 102b, and operations are commenced. Here, instruction so as to perform narrowing of the aperture 102b is performed until the required opening amount for still picture continuous shooting, that has been determined in advance by exposure amount computation for AE (Automatic Exposure) etc., is reached.

Once simultaneous drive of the aperture and focus lens is finished, next the CPU 216 commences actual exposure (S55). Actual exposure is an exposure operation in order to acquire image data for storage. In the actual exposure, the CPU 216 controls the drive section 204 so as to open the mechanical shutter 202 for an exposure period required for still picture continuous shooting that has been determined in advance. The CPU 216 then executes an imaging operation of the image sensor 208 for the duration of the exposure period. After determination of the exposure period by closing the mechanical shutter 202, the imaging control circuit 210 reads out pixel signals from each pixel of the image sensor 208. After pixel signal readout, the image processing circuit 218 performs processing for correction of pixel output of focus detection pixels, and other processing for generating image data for storage. After completion of image processing, the image compression and expansion section 220 compresses the image data for storage. After completion of compression, the CPU 216 stores the image data for storage that has been compressed in the storage medium 232 as an image file.

Once processing for actual exposure has been completed, next simultaneous drive (opening) of the aperture and the focus lens is performed (S57). In this step, the CPU 216 instructs the lens CPU 106 so as to drive the aperture 102b. Here, instruction so as to perform drive to open the aperture 102b is performed until a required opening amount (for example, wide open aperture) for exposure for live view and exposure for AF is reached. Also, in the case of continuous shooting mode the focus lens is driven to a target position based on results of motion prediction (moving body estimation computation) in step S43. It should be noted that the processing of this step may be performed concurrently with read out of pixel signals after the actual exposure of step S55. As a result of this type of concurrent processing, it is possible to prolong the display time of a live view image during the actual exposure.

If simultaneous drive of the aperture and focus lens has been performed, it is determined whether or not there is a state where the 1st release switch is on or the 2nd release switch is on (S59). In this step, the CPU 216 returns to step S19 if the 1st release switch or the 2nd release switch are on. After that, if continuous shooting is in progress (S25 yes) actual exposure is performed (S55) after having performed focus detection (S23, S33, S39, S41, S43) etc. On the other hand, if the result of determination in step S59 is that the 1st release switch or the 2nd release switch are not on, processing advances to step S61.

Returning to step S25, if the result of determination in this step is that continuous shooting is in progress, the defocus amount is converted to lens pulse position (S33). In this step, the focus detection circuit 222 performs processing to convert the defocus amount to a focus target position. In this conversion processing, focus target position is calculated for each AF area for which defocus amount has been calculated in step S23. The focus target position that has been calculated in this step is used in the reference determination processing of step S37, the third area selection processing of step S39, the moving body estimation computation of step S43, and the focus lens drive of step S49 or step S53.

Once lens pulse position conversion has been performed, next the target (object) range is determined (S35). In this step, the CPU 216 determines a range in which focus detection is performed using the same processing as for step S29, based on priority ranges that were divided in step S27.

Once target range has been determined, the CPU 216 next performs reference determination processing (S37). Here, the CPU 216 determines a reference position used as a reference in the third area selection that is executed in step S39. Details of the reference determination processing will be described later (refer to S75, S81 and S85 in FIG. 3, and to the section entitled "<Reference Determination Processing>").

Once reference determination processing has been performed, the CPU 216 next performs area selection 3 (S39). Here, in order to focus on a main subject, an appropriate focus target position is selected from a plurality of focus target positions based on the focus target position that was calculated in step S33, the target range that was determined in step S35, and the reference position that was determined by the reference determination processing of step S37. Specifically, with this processing an AF area is selected based not on the defocus amount, which is a relative position, but based on the lens pulse position which is an absolute position. Details of the third area selection processing will be described later (refer to S77, S83 and S87 in FIG. 3, and to the section entitled "<Third Area Selection Processing>"). Once area selection 3 has been performed, processing advances to step S41, and the previously described processing is executed.

It should be noted that in the focus adjustment device control processing of this embodiment, performing the processing of step S33 to step S39 is after having determined that continuous shooting is in progress in step S25, after having determined that the 2nd release is on in step S45. That is, in the control processing for the focus adjustment device of this embodiment, the reference determination processing and the third area selection processing are performed while C-AF continuous shooting is in progress. It should be noted that the reference determination processing and the third area selection processing may be performed while 1st release is being maintained, and may be performed while imaging for LV display is in progress. Detailed operation in steps S33 to S39 will be described later using FIG. 3.

In step S61 the CPU 216 determines whether or not the power supply of the camera body 200 is off. For example, it is determined that the power supply is off if turning the power supply off has been instructed by the user by operating the operation section 206, or if the user has not operated the operation section 206 for a predetermined time. Processing returns to step S1 if it has been determined that the power supply off the camera body 200 is not off, and the original flow is terminated if it has been determined that the power supply is turned off.

Next, operation of the lens pulse position conversion of step S33, the target range determination of step S35, the reference determination processing of step S37, and the area selection 3 of step S39 will be described using the flowchart shown in FIG. 3. The processing of these steps will be collectively called center priority 1R second time processing. With this center priority 1R second time processing, when continuous shooting is set and shooting is performed for the second and subsequent frames, selection of AF area is performed within the target range for focus adjustment that was determined in step S35.

Once the flow for center priority 1R second time processing is commenced, first priority range division is performed (S71). Processing here is the same as the priority range division of steps S11 and S27 described previously. Specifically, a focus detection area that has been designated by the user is divided into a first priority range (area), a second priority range (area), and a third priority range (area). With this embodiment, a central area of a focus detection range (area) that has been designated by the user is made a first priority range (area).

Once division of priority range has been performed, next the CPU 216 determines whether or not a central area will be made an target (object) range (S73). The central area is a central AF area positioned in the center inside the focus detection range (area) that has been designated by the user. A determination condition here is whether or not ranging result (defocus amount) for the central area is within a specified range (for example, 0 to 4F$\delta$) from the reference position. If the ranging result is within range, the central area is made a target range for focus adjustment.

If the result of determination in step S73 is that the central area is made the target range, the CPU 216 performs reference position determination processing from the central area results (S75). Here, the reference position is changed if a difference between reference position and, for example, a focus target position that is close to this reference position, is greater than or equal to a predetermined value (for example, $-1F\delta \times 3fr$ to $+1F\delta \times 3fr$). It should be noted that in the term F$\delta$, F represents aperture FNo., and $\delta$ represents permissible circle of confusion. F is also known as F value, or aperture value. Generally, F$\delta$ represents permissible depth. There may also be cases where F$\delta$ is expressed as 1F$\delta$. fr represents number of frames, and $-1F\delta \times 3fr$ to $+1F\delta \times 3fr$ indicates that the difference is contained in the range $-1F\delta$ to $+1F\delta$ continuously for three frames. It should be noted that in this embodiment reference position is changed if the difference is within range for three frames continuously, but the number of frames is not limited to three and there may be a specified number of frames. General reference position determination processing will be described later.

Once reference position determination processing has been performed, a central area that is the first priority range (area) is selected (S77). As area selection in the previously described area selection 3, the CPU 216 selects the central area (first priority range (area)).

If the result of determination in step S73 is that the central area is not the target range the CPU 216 determines whether or not to make the first and second priority ranges (areas) the target (object) range (S79). A determination condition here is whether or not ranging result (defocus amount or difference between reference position and focus target position) for the first priority range (area) and the second priority range (area) is within a specified range (for example, 0 to 4Fδ) from the reference position. If the ranging result is within the specified range, the CPU 216 makes the first priority range (area) and the second priority range (area) the target (object) range for focus adjustment.

If the result of determination in step S79 is that the first and second priority ranges (areas) will be made the target (object) range, determination processing for reference position is performed from ranging results of the first and second priority range (S81). Here, the CPU 216 changes reference position if a difference between reference position and, for example, a focus target position that is close to this reference position, is greater than or equal to a predetermined value. The predetermined value, as an approaching value in a case where the subject is approaching, corresponding to a difference between, for example, reference position and focus target position corresponding to the closest range is 1.5F}× 1fr. On the other hand, the predetermined value, as a distancing value in a case where the subject is far away, corresponding to a difference between, for example, reference position and focus target position close to the reference position is −3Fδ×3fr.

Once reference position determination processing has been performed, an area within the first and second priority range (area) is selected (S83). As area selection of the previously described area selection 3, selection is performed from the first and second priority range (areas). In the selection, in a case where reference position change for approaching has been performed, an area in which focus target position is closest to the reference position is selected. As long as the focus target position is in an area closest to the reference position, it does not need to be a central area. Also, in a case where determination conditions for changing reference position are not satisfied, the motion prediction formula is established, and a subject is moving at a specified speed or faster (positive gradient of a prediction formula is greater than or equal to a specified value), the second closest area of defocus amount is selected. Also, processing for the case where the above described two conditions are not satisfied will be described later.

If the result of determination in step S79 is that the first and second priority ranges (areas) will not be made the target (object) range, determination processing for reference position is performed from all results in a ranging calculation range (S85). Here, from all results of the ranging calculation range (including the first priority range (area), second priority range (area) and third priority range (area)), the CPU 216 changes reference position if a difference between reference position and a focus target position close to this reference position is greater than or equal to a predetermined value, i.e. large. The predetermined value, as an approaching value in a case where the subject is approaching, corresponding to a difference between, for example, reference position and focus target position corresponding to the closest range is 1.5Fδ×1fr. On the other hand, the predetermined value, as a distancing value in a case where the subject is far away, corresponding to a difference between, for example, reference position and focus target position close to the reference position is −3Fδ×3fr.

Once reference position determination processing has been performed, an area among all results of ranging calculation range is selected (S87). The CPU 216 selects an area from among the whole ranging calculation range as area selection for the previously described area selection 3. Conditions for selection of this area selection are the same as for step S83 except for target range being different, and so detailed description is omitted. Once an area has been selected in steps S77, S83 or S87, the originating flow is returned to.

In this way, in the flow for center priority 1R second time processing, first, division of priority range is performed based on focus adjustment area that has been set by the user (S71). In accordance with this division, first, in a priority range positioned in the center, it is determined whether or not a difference between focus target position and defocus amount or reference position is within a specified range (S73), and if the difference is within the specified range an area that is positioned in the center is selected as the first priority range (S77). If a difference between the focus target position and the defocus amount or reference position for the area that is positioned in the center is not within the specified range, range of first and second priority ranges is widened outward, and it is determined whether or not a difference between focus target position, and the defocus amount or the reference position, is within a specified range (S79). After that, if a difference between focus target position and the defocus amount or reference position enters into the specified range, an area that is within the range is selected (S83, S87). Also, among the respective processes, reference position is changed in accordance with difference between reference position and, for example, focus target position that is close to this reference position, and reference position is determined using reference position determination processing that will described later (S75, S81, and S85).

<Reliability Determination>

Figure 4:
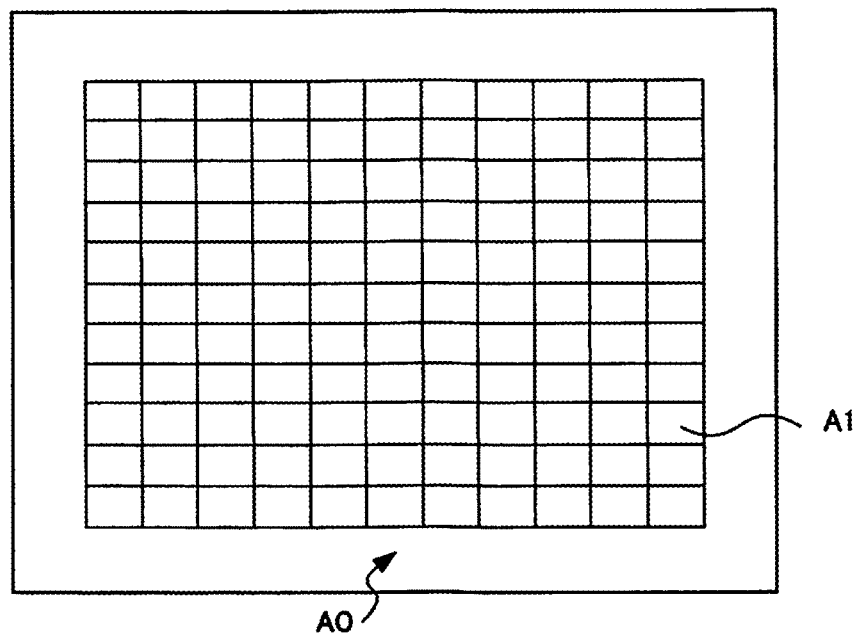
FIG. 4 is a schematic diagram showing one example of a plurality of AF areas of one embodiment of the present invention.

Here, reliability determination for two-image interval value executed in step S7 and step S21 will be described with reference to the drawings. FIG. 4 is a schematic drawing showing one example of overall AF area A0 in this embodiment. As shown in FIG. 4, the image plane of the image sensor 208 is provided with a plurality of AF areas A1, and the overall AF area A0 contains the plurality of AF areas A1. The AF areas A1 are respectively arranged 11 at a time vertically and horizontally. That is, the overall AF area A0 contains 121 AF areas A1. Reliability determination is performed, for example, for each of the 121 AF areas A1.

It should be noted that because of the arrangement of focus detection pixels it is possible to respectively obtain two-image interval values in two phase difference detection directions, namely the vertical direction and the horizontal direction, for a single AF area A1. In this case, the reliability determination is performed for the vertical direction and for the horizontal direction, for each of the 121 AF areas A1.

Reliability determination includes determination as to whether or not contrast amount of focus detection pixel output is sufficient. Reliability determination also includes determination as to whether or not a minimum value of correlation calculation results is sufficiently small. Reliability determination includes determination as to whether or not a gradient FS between minimal value of correlation calculation results and a value that is largest, among correlation calculation results for positions on both sides of a position where the minimum value arises, is sufficient. Determination as to whether or not gradient FS is sufficient can also be expressed as determination as to whether or not there is a V-shaped edge.

It should be noted that threshold values for reliability determination may be set separately as a value for at the time of area selection and a value for simple in-focus determination. At the time of area selection, stable area selection is executed by setting a threshold value strictly, and at the time of in-focus determination execution etc. a threshold is set to the lowest level that is sufficient for ensuring precision.

Also, determination conditions for reliability determination are not limited to the three conditions described above, and other conditions may be added, and some of these three conditions may be omitted. Also, a degree of to what extent all of the conditions have been satisfied may be calculated as a numerical value, and determination as to whether or not respective AF areas A1 satisfy all conditions may be determination such as evaluating reliability based on this numerical value.

<Computation Time For Addition Of Correction Amounts>

Here, description will be given of shortening of computation time for detection of defocus amount, executed in step S9 and step S23. In step S9 and step S23, for example, optical correction amount is added to defocus amount for each of the AF areas A1. Here, in the event that it is desired to reduce computation time for addition of correction amount, the focus detection circuit 222 performs processing as described below, for example.

(Group Target Case)

A case where AF area setting is group target will be described. In the case of group target, a range in which computation of correction amount is executed is a five-point group or a nine-point group. A five-point group includes, for example, five AF areas A1 among the 121 AF areas A1 of the overall AF area A0. A nine-point group includes nine of the 121 AF areas A1 of the overall AF area A0.

The focus detection circuit 222 calculates correction amount for a single AF area A1 contained within the group target. The focus detection circuit 222 sets correction amount for a single AF area A1 that has been calculated as a provisional correction amount. The focus detection circuit 222 adopts the same provisional correction amount for all AF areas A1 within the group target.

(All Target Case)

Figure 5:
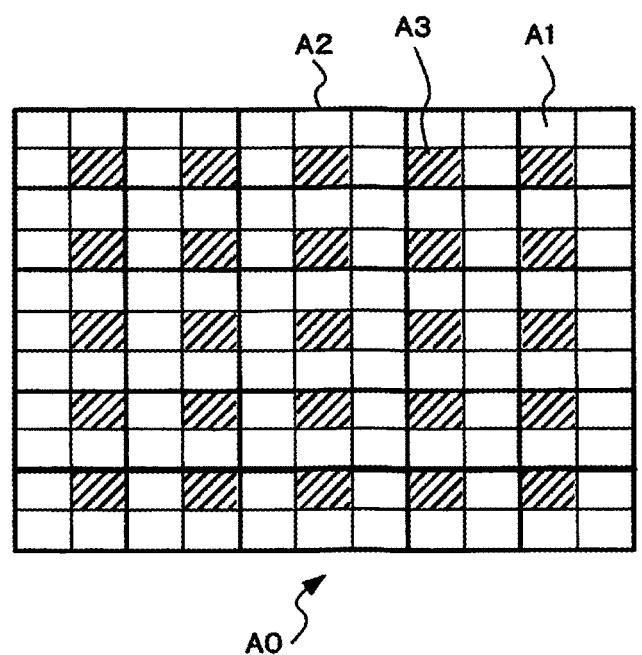
FIG. 5 is a schematic diagram showing one example of calculation units for correction amount in the case of all target, in one embodiment of the present invention.

A case where AF area setting is all target will be described. In the case of all target, a range in which computation of correction amount is executed is the overall AF area A0. However, similarly to the group target case described above, the focus detection circuit 222 adopts the same correction amount as a provisional correction amount in a group of regions. FIG. 5 is a schematic diagram showing one example of calculation units for correction amount in the case of all target. As shown by the bold lines in FIG. 5, a plurality of correction amount execution ranges A2 are set within the overall AF area A0. Each correction amount execution range A2 contains a plurality of AF areas A1. The number of AF areas A1 included in a correction amount execution range A2 differs depending on the correction amount execution range A2. For example, the correction amount execution range A2 positioned in the center of the overall AF area A0 contains three vertical by three horizontal, i.e. a total of nine, AF areas A1. Similarly, correction amount execution ranges A2 above and below the center respectively contain 2×3, namely 6, AF areas A1, correction amount execution ranges A2 to the left and right of the center respectively contain 3×2, namely, 6 AF areas A1, and correction amount execution ranges A2 at other positions contain 2×2, namely 4, AF areas A1. Specifically, there are 25 correction amount execution ranges A2 set in the overall AF area A0.

The focus detection circuit 222 performs calculation of correction amount for each correction amount execution range A2. The focus detection circuit 222 calculates correction amount for a single AF area A3 contained within a correction amount execution range A2. Here, an AF area A3 in which correction amount is calculated is an AF area A1 shown by hatching in FIG. 5. As shown in FIG. 5, the AF area A3 is the AF area A1, among AF areas A1 contained in each correction amount execution range A2, that is arranged at a position closest to the center of the image sensor 208. The focus detection circuit 222 sets correction amount for a single AF area A3 that has been calculated as a provisional correction amount. The focus detection circuit 222 adopts the same provisional correction amount for all AF areas A1 within the correction amount execution range A2.

Accordingly, computation of correction amount can be completed in the calculation time needed for 25 times in each of two directions, and not for 121 times in each of two directions. Then, at the time of calculating final defocus amount in order to perform lens drive, the focus detection circuit 222 may finally calculate a correct correction amount for an AF area that has been selected in area selection processing, which will be described later.

It should be noted that the AF area A3 within the correction amount execution range A2 is not limited to the arrangement shown in FIG. 5. Any AF area A1 among the AF areas A1 contained in the correction amount execution range A2 may be selected as the AF area A3.

<Conversion of Defocus Amount to Lens Pulse Position>

Here, processing to convert defocus amount to lens pulse position, implemented in step S16, step S32, and step S33, will be described. This processing is performed in step S16 for defocus amount that is output for an AF area that was selected by the first area selection processing. This processing is also performed after the area selection 2 of step S31. In this case the processing is performed for defocus amount that is output for an AF area that was selected by the second area selection processing. Further, this processing is performed in step S33 for each of the AF areas A1 for which defocus amount was calculated in step S23.

Defocus amount is converted to lens pulse position using an approximate expression. An approximate expression is, for example, a tertiary expression for defocus amount determined for each interchangeable lens. For example, defocus amount PD that has been converted to lens pulse position is represented as shown in equation (1). Also, with this processing focus target position TLP is calculated for each of the AF areas A1. Focus target position TLP can also be expressed as in-focus lens position or in-focus pulse position. Focus target position TLP is represented as shown in equation (2), using current lens position and defocus amount PD that has been converted to lens pulse position. It should be noted that focus target position TLP and current lens position are respectively lens pulse positions.

$$PD = ax(\text{Def})^3 + bx(\text{Def})^2 + cx(\text{Def}) \qquad \text{equation (1).}$$

$$TLP = CLP + PD \qquad \text{equation (2)}$$

Here, Def is defocus amount. Respective coefficients of a, which is a proportional constant of the cubic term, b, which is a proportional constant of the quadratic term, and c, which is a proportional constant of the linear term, are values determined uniquely for each photographing lens using zoom value of the photographing lens and current lens position.

In this way, defocus amount which represents a relative position is converted to lens pulse position which represents an absolute position. The focus target position TLP that has been calculated is used in drive of the focus lens 102a of steps S17, step S49 and step S53, the moving body estimation computation of step S43, the reference determination processing of step S37, and the third area selection processing of step S39.

It should be noted that processing related to conversion of the defocus amount to lens pulse position that is performed in step S33 may also be performed at the time defocus amount has been detected in step S9, for example. At this time, this processing is performed for each of the AF areas A1 for which defocus amount has been calculated in step S9. Also, processing related to conversion of the defocus amount to lens pulse position that is performed in step S32 and step S33 may also be performed at the time defocus amount has been detected in step S23, for example. At this time, this processing is performed for each of the AF areas A1 for which defocus amount has been calculated in step S23.

<Division of Priority Range>

Figure 6A:
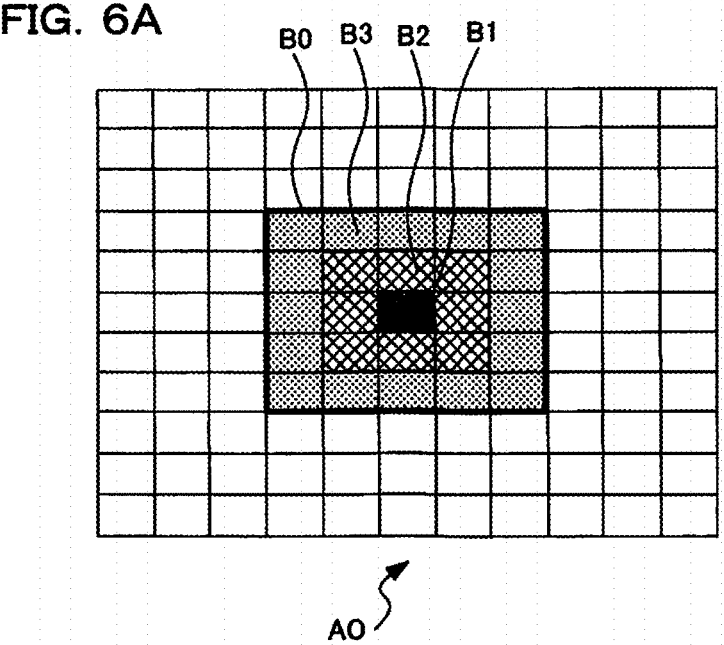
FIG. 6A and FIG. 6B are schematic diagrams showing one example of division of priority range in one embodiment of the present invention.
Figure 6B:
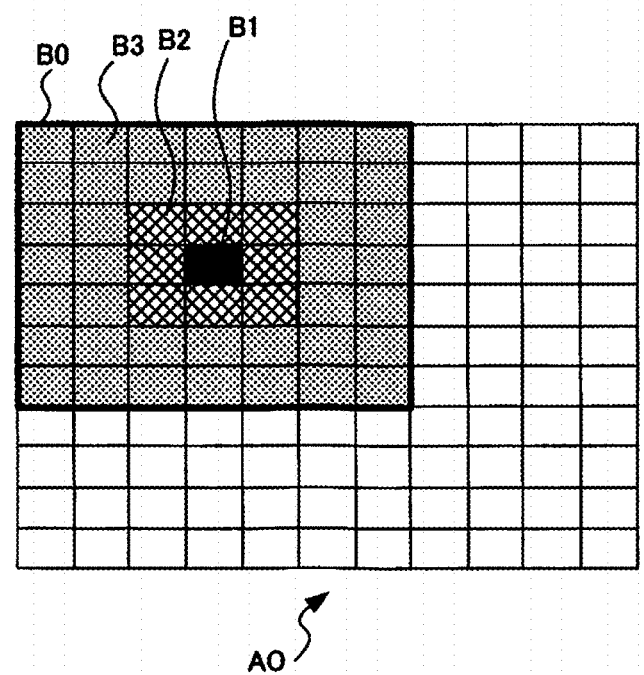

Next, the division of priority range in steps S11 and S27 will be described using FIG. 6A and FIG. 6B. With this embodiment, the user can set a range in which to perform focus adjustment as a user set area B0, using the operation section 206. The user can also set a center priority function for setting a central area to a priority range (area) for focus adjustment, using the operation section 206. If this center priority function has been set, a first priority range (area) B1, second priority range (area) B2, and third priority range (area) B3 are set, as shown in FIG. 6A and FIG. 6B. In the event that these priority ranges (areas) are set, then as was described previously, a priority range (area) is selected from among the 1st to 3rd priority ranges (areas) depending on defocus amount.

FIG. 6A shows a case where the user has set a range (an area) B0 for focus adjustment substantially in the center of the photographing screen. In this case, the CPU 216 sets the third priority range (area) B3 having a width of one area at the four immediately inner sides of the set range (area) B0 for focus adjustment. The CPU 216 also sets second priority range (area) B2 having the width of a single area at the four immediately inner sides of the third priority range (area) B3. Further, the CPU 216 sets the first priority range (area) B1 substantially in the center of the range (area) B0 for focus adjustment immediately inside the second priority range (area) B2.

FIG. 6B shows a case where the user has set a range (an area) B0 for focus adjustment at the upper left of the photographing screen. Compared to the case shown in FIG. 6A, in FIG. 6B the set range (area) B0 is wider (specifically, the center range (area) B0 is 5×5 in the case of FIG. 6A, and is 7×7 in the case of FIG. 6B). The case of FIG. 6B is also the same in that the CPU 216 arranges the first priority range (area) B1 in the vicinity of the center of range (area) B0, arranges the second priority range (area) B2 outside the first priority range (area) B1, and further arranges the range (area) of the third priority range (area) B3 further outside the second priority range (area) B2. However, with FIG. 6B since the range (area) B0 is wider, the width of the third priority range (area) B3 is widened to that of two ranges (areas).

It should be noted that in FIG. 6A and FIG. 6B the range (area) B0 for focus adjustment set by the user is formed in a shape having the same number of areas in the horizontal and vertical directions. However, this is not limiting, and the range (area) B0 may also be formed in a shape having different numbers of areas in the vertical and horizontal directions. In this case also, the first priority range (area) is preferably made a single area in the center, and the second priority range (area) has the width of a single area around the first priority range (area). However, as user settings or design values, the first, second and third priority range (areas) may be set in a different way from this. Also, depending on the situation, the second and third priority ranges (areas) may be set not within the range (area) B0 for focus adjustment, but outside this range (area). For example, in the case of single target, since only a single AF area A1 is designated as the range (area) B0 for focus adjustment, in this case the second priority range (area) around the AF area A1, and the third priority range (area) outside of the second priority range (area), may be set.

<Target range Determination>

Next, determination of target (object) range in steps S29 and S35 will be described. As was described previously, with the present invention the target range for focus adjustment is made into three ranges, namely first, second, and third priority ranges. This target range is determined as follows.

$$C1 \leq (L1-ST) \leq C2 \qquad \text{(Condition 1)}$$

If the above described (condition 1) is satisfied, the target range for focus detection is made only the first priority range.

(Condition 2) when (1) described above is not satisfied, if $C3 \leq (L2-ST) \leq C4$ is satisfied, the focus detection range is made the range for first priority range and second priority range.

(Condition 3) If (condition 2) described above is not satisfied, focus detection range is made the range for first, second, and third priority.

Here, C1 to C4 are constants, and have a size relationship of $C1 \leq C3 \leq C2 \leq C4$. Also, L1 means lens position (focus target position) of the first priority range (area), L2 means lens position (focus target position) of the first and second priority ranges (areas), and ST means reference position.

<First Area Selection Processing>

Next, the first area selection processing that is executed in step S13 will be described in further detail with reference to the drawings. The first area selection processing is executed in the period from when a commencement instruction for focus adjustment is issued from the focus adjustment instruction section 206a, until in-focus determination is performed. Here, a point in time where a commencement instruction for focus adjustment has been issued from the focus adjustment instruction section 206a, is when it has been determined in step S1 that the 1st release switch has been pressed down. The time when in-focus determination is performed is when determination as to whether or not there is a temporary focused state is performed in step S15. With the first area selection processing, an AF area A1 exhibiting a maximum value for positive defocus amount, among the plurality of defocus amounts, is selected. An AF area exhibiting a maximum value of defocus amount can be considered to be AF area A1 indicating the closest range.

(Single Target Case)

In the case of single target, for example, for a single AF area A1 that has been designated by the user, phase difference is respectively detected in two phase different detection directions, namely the vertical direction and horizontal direction. That is, two-image interval values are respectively obtained for the phase difference detection directions. A phase difference detection direction showing a maximum value of defocus amount, among phase difference detection directions that have been determined to have reliability, is selected. A defocus amount indicated in the phase difference detection direction that is been selected is adopted. It should be noted that an AF area Al in which the phase difference detection calculation is performed may be represented as an AF calculation execution range.

(Group Target Case)

Figure 7:
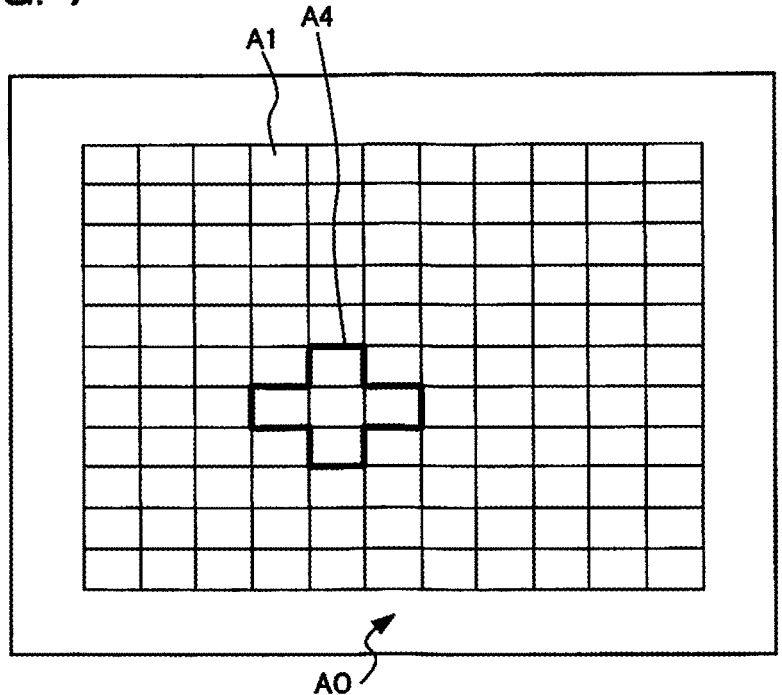
FIG. 7 is a schematic diagram showing one example of AF calculation execution range in a case of group target for first area selection processing, in one embodiment of the present invention.
Figure 8:
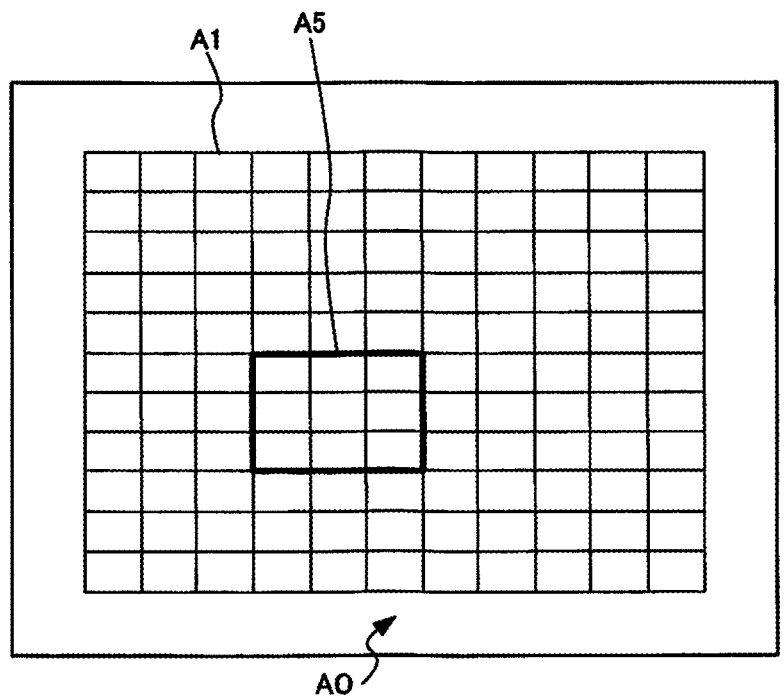
FIG. 8 is a schematic diagram showing one example of AF calculation execution range in a case of group target for first area selection processing, in one embodiment of the present invention.

FIG. 7 is a schematic diagram showing one example of AF calculation execution range A4 in a case of five groups for first area selection processing, in this embodiment. The AF calculation execution range A4 in the case of five groups is a cross-shaped region that is shown enclosed by a thick-line frame in FIG. 7. FIG. 8 is a schematic diagram showing one example of AF calculation execution range A5 in a case of nine groups for first area selection processing, in this embodiment. The AF calculation execution range A5 in the case of nine groups is a rectangular region that is shown enclosed by a thick-line frame in FIG. 8.

In the case of group target, for example, AF areas A1 inside the AF calculation execution range that have been designated by the user will be considered. An AF area A1 exhibiting a maximum value of defocus amount, among the AF areas A1 within the AF calculation execution range that have been determined to have reliability, is selected. A defocus amount exhibited by the AF area A1 that has been selected is adopted.

It should be noted that after an AF area A1 exhibiting the maximum value of defocus amount has been selected, then similarly to the case of single target, a phase difference detection direction exhibiting a maximum value of defocus amount may be further selected. In this case, a phase difference detection direction that exhibits a maximum value of defocus amount, among defocus amounts exhibited by the two phase difference detection directions, is selected.

It should be noted that selection of phase difference detection direction is not limited to being after the AF area A1 exhibiting the maximum value of defocus amount has been selected. For example, a phase difference detection direction showing a maximum value of defocus amount, among phase difference detection directions contained in AF areas A1 that have been determined as a result of reliability determination to have reliability, is selected. At this time, defocus amount exhibited in the phase difference detection direction that is been selected is adopted.

(All Target Case)

Figure 9:
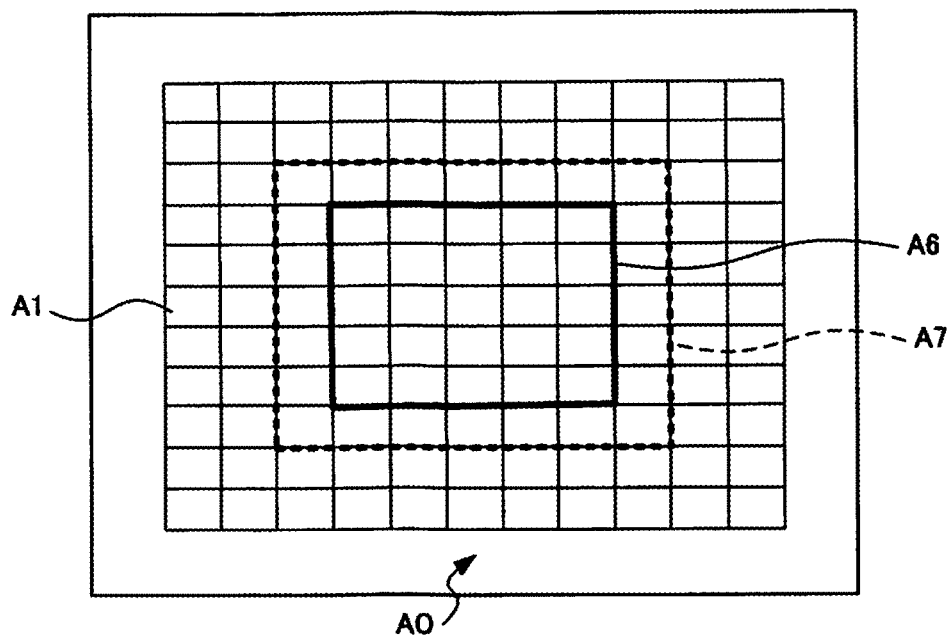
FIG. 9 is a schematic diagram showing one example of AF calculation execution range in a case of all target for first area selection processing, in one embodiment of the present invention.

AF calculation execution range in the case of all target is the overall AF area A0. However with the first area selection processing of this embodiment, in the case of all target, a range in which AF calculation will be executed on a priority basis is set. FIG. 9 is a schematic diagram showing one example of priority execution range for AF calculation in a case of all target for first area selection processing, in this embodiment. As shown in FIG. 9, an AF calculation priority execution range includes a first AF calculation priority execution range A6 and a second AF calculation priority execution range A7. The first AF calculation priority execution range A6 is a region that is shown enclosed by a thick solid line frame in FIG. 9. The first AF calculation priority execution range A6 is a region that contains 25 central AF areas A1, within the overall AF area A0. The second AF calculation priority execution range A7 is a region that is shown enclosed by a dashed line frame in FIG. 9. The second AF calculation priority execution range A7 is a region that contains 49 central AF areas A1, within the overall AF area A0.

In the case of all target, first, AF areas A1 within the first AF calculation priority execution range A6 will be considered. At this time, it is determined whether or not AF areas A1 that have been determined to have reliability exist within the first AF calculation priority execution range A6.

The case where AF areas A1 that have been determined to have reliability exist within the first AF calculation priority execution range A6 will be described. In this case, an AF area A1 showing a maximum value of defocus amount, among the AF areas A1 that have been determined to have reliability, is selected. That is, an AF area A1 exhibiting a defocus amount that is at the closest range is selected.

The case where AF areas A1 that have been determined to have reliability do not exist within the first AF calculation priority execution range A6 will be described. In this case, instead of AF areas A1 within the first AF calculation priority execution range A6, AF areas A1 within the second AF calculation priority execution range A7 are considered. At this time, it is determined whether or not AF areas A1 that have been determined to have reliability exist within the second AF calculation priority execution range A7.

A case where AF areas A1 that have been determined to have reliability do not exist within the first AF calculation priority execution range A6, and do exist within the second AF calculation priority execution range A7, will be described In this case, an AF area A1 showing a maximum value of defocus amount, among the AF areas A1 that have been determined to have reliability, is selected. That is, an AF area A1 exhibiting a defocus amount that is at the closest range is selected.

A case where AF areas A1 that have been determined to have reliability do not exist within either the first AF calculation priority execution range A6 or within the second AF calculation priority execution range A7, will be described In this case, instead of AF areas A1 within the second AF calculation priority execution range A7, 121 AF areas within the overall AF area A0 are considered. At this time, an AF area A1 showing a maximum value of positive defocus amount, among the AF areas A1 that have been determined to have reliability within the overall AF area A0, is selected. That is, an AF area A1 exhibiting a defocus amount that is at the closest range is selected.

In this way, in the case of all target, with center priority, an AF area A1 exhibiting a defocus amount that is at the closest range, among AF areas A1 that have been determined to have reliability, is selected.

It should be noted that in the case of all target also, similarly to the case of group target, selection may be for defocus amount indicated in a phase difference detection direction.

(Case of Tracking AF)

In the case of tracking AF, AF area A1 is selected based on AF area settings for single target, group target, or all target described above. A defocus amount exhibited by the AF area A1 that has been selected is adopted. However, in the case of tracking AF, a selected AF area A1 that will be selected will sometimes be updated based on subject movement (tracking results).

(Case of Face AF)

Figure 10:
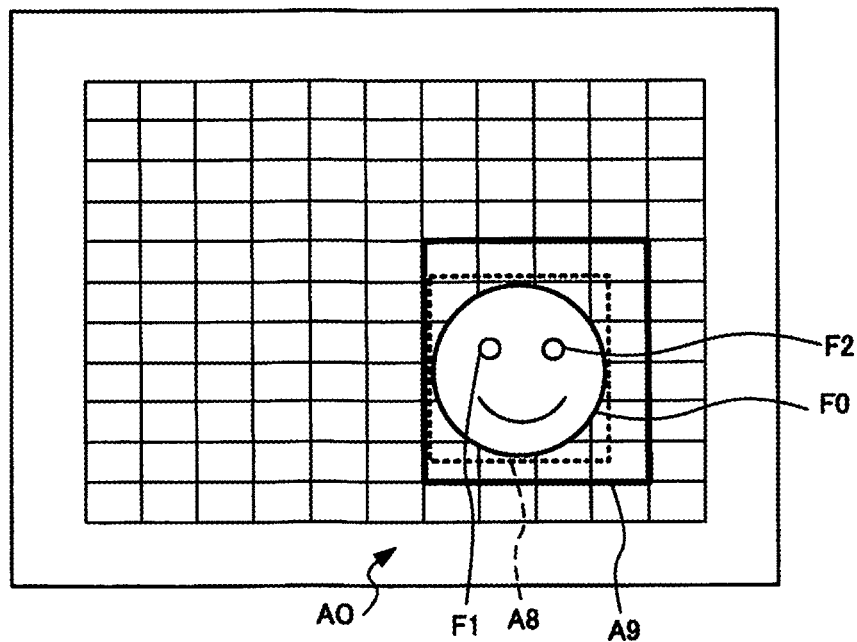
FIG. 10 is a schematic diagram showing one example of face detection range and AF calculation execution range in a case of face AF for first area selection processing, in one embodiment of the present invention.

FIG. 10 is a schematic diagram showing one example of face detection range A8 and AF calculation execution range A9 in a case of face AF for first area selection processing, in this embodiment. The face detection range A8 in the case of face AF is a region that is shown enclosed by a dashed line frame in FIG. 10. The face detection range A8 is a range in which a face F0 exists. The face detection range A8 is determined based on detection results of the face detection circuit 236. The AF calculation execution range A9 in the case of face AF is a region that is shown enclosed by a thick solid line frame in FIG. 10. The AF calculation execution range A9 is determined based on the face detection range A8. With this embodiment, a case will be explained where pupil position F1 and pupil position F2 are being detected by the pupil detection circuit provided by the face detection circuit 236, as shown in FIG. 10.

Figure 11:
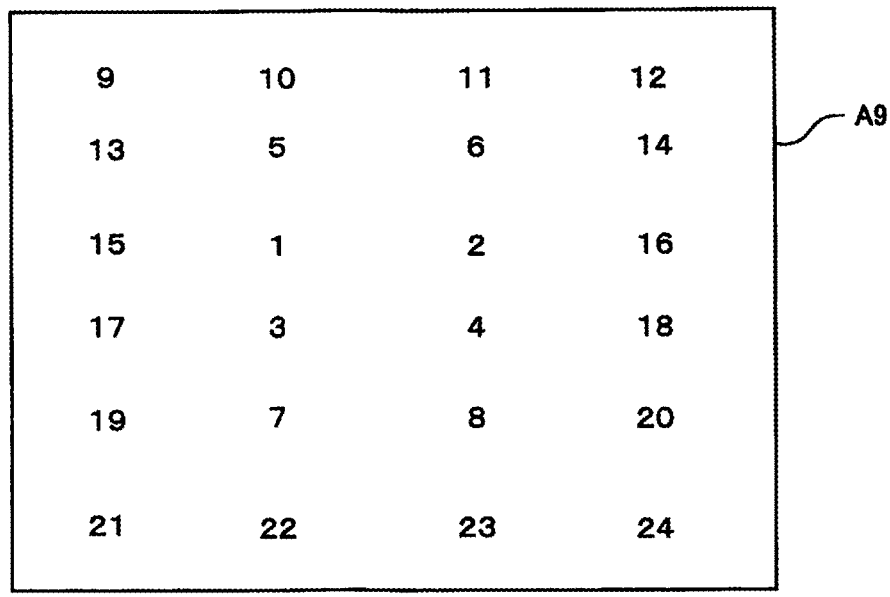
FIG. 11 is a schematic diagram showing one example of priority ranking for selection of AF areas included in AF calculation execution range in a case of face AF for first area selection processing, in one embodiment of the present invention.

FIG. 11 is a schematic diagram showing priority ranking for selection of AF areas A1 contained in the AF calculation execution range A9 for the case shown in FIG. 10. The numbers shown six vertically by four horizontally in FIG. 11 respectively correspond to the 6 vertical by 4 horizontal AF areas A1 within the AF calculation execution range A9 shown in FIG. 10. FIG. 11 shows priority ranking for selecting respective AF areas A1 within the AF calculation execution range A9. The lower the value of the number in FIG. 11, the higher priority ranking that is represented. As shown in FIG. 11, priority ranking of the AF area A1 corresponding to the pupil position F1 is set to first. Also, priority ranking of the AF area A1 corresponding to the pupil position F2 is set to second. It should be noted that the priority rankings for the AF area A1 corresponding to pupil position F1 and the AF area A1 corresponding to pupil position F2 shown in FIG. 11 are merely one example, and the priority ranking of the AF area A1 corresponding to pupil position F2 may be set to first.

In the case of face AF, AF areas A1 within the AF calculation execution range A9 are considered. At this time, an AF area Al that is closest to a pupil position, among AF areas A1 that have been determined to have reliability, is preferentially selected, in accordance with the priority ranking shown in FIG. 11. It should be noted that in the event that an AF area in the vicinity of a pupil position does not have reliability, an AF area of the center of the face is preferentially selected.

For example, when it has been determined that an AF area A1 corresponding to pupil position F1, for which the priority ranking shown in FIG. 11 is first, has reliability, AF area A1 corresponding to pupil position F1 is selected. It should be noted that there may also be a specification such that when it has been determined that an AF area A1 corresponding to pupil position F1 or an AF area A1 corresponding to pupil position F2 has reliability, the AF area A1 having the highest reliability, of these two areas, is selected. On the other hand, there may also be cases where neither an AF area A1 corresponding to pupil position F1, or an AF area A1 corresponding to pupil position F2 has reliability. In this case, an AF area for which the priority ranking shown in FIG. 11 is the highest, among the AF areas that have reliability, is preferentially selected.

In this way, with face AF for first area selection processing, among a plurality of defocus amounts that have been repeatedly detected by the focus detection circuit 222 in respective AF areas, an AF area corresponding to a position of a pupil within the face detection range, or an AF area that has been determined to have high reliability, is selected.

It should be noted that although with this embodiment description has been given for case where the face detection range A8 has 4×4 AF areas, this is not limiting. The face detection range A8 may contain 3×3 AF areas or 5×5 AF areas, depending on the size of the face F0. Also, the AF calculation execution range A9 may change in accordance with size of the face detection range A8.

Although description has been given for CPU 216 executing first area selection processing in a period from issuance of an instruction to commence focus adjustment, from the focus adjustment instruction section 206a, until temporary in-focus determination is performed, this is not limiting. For example, the CPU 216 may perform similar processing to the first area selection processing when performing an exposure operation for LV display, that is repeatedly performed until it is determined that the 1st release switch is in an on state. Specifically, until an instruction to commence focus adjustment is issued from the focus adjustment instruction section 206a, processing to select an AF area indicating the closest range, among a plurality of defocus amounts repeatedly detected in respective AF areas by the focus detection circuit 222, may be performed. With face AF also, for example, until an instruction to commence focus adjustment is issued from the focus adjustment instruction section 206a, processing may be performed to select, among the plurality of defocus amounts, an AF area corresponding to a pupil position within the face detection range, or an AF area for which high reliability has been determined.

<Second Area Selection Processing>

Here, the second area selection processing that is executed in step S31 will be described in further detail with reference to the drawings. The second area selection processing is executed once after focus has been achieved on a main subject, and an AF area is selected as follows. Here, the expression once after focus has been achieved on a main subject means, for example, a focused state is determined once after 1st release ON (S1 Yes→S15 Yes, FIG. 2A), and after that also maintained with $1^{st}$ release being ON.

While 1st release is being maintained, it is necessary to continue AF, concentrating on the main subject. At the time of such a state where the main subject is in focus, as long as the main subject does not move a defocus amount is correct at a value of zero. Also, taking shortness of exposure time into account, in a case where a subject moves, since it is considered that the main subject generally moves at a constant velocity and over a short distance, it can be said that an AF area exhibiting a defocus amount that is based on a motion prediction formula exhibits a correct defocus amount.

{AF Calculation Execution Range}

Here, AF calculation execution range of the second area selection processing will be described. Defocus amount is calculated for AF areas within the AF calculation execution range.

(Single Target Case)

In the case of single target, the AF calculation execution range is a single AF area A1 that has been selected. At this time defocus amount is calculated in each of the horizontal direction on the vertical direction, for the AF area A1 that has been selected.

(Group Target Case)

In the case of group target, such as five groups or nine groups, the AF calculation execution range is AF areas A1 within a selected group target. At this time defocus amount is calculated in each of the horizontal direction and the vertical direction, for the AF areas A1 within the group target that has been selected.

(All Target Case)

In the case of all target, the AF calculation execution range has 121 AF areas A1 within the overall AF area A0. At this time, defocus amount is calculated in, for example, a 5×5 AF calculation execution range, with the previously selected AF areas A1 as a center.

(Case of Tracking AF)

Figure 12:
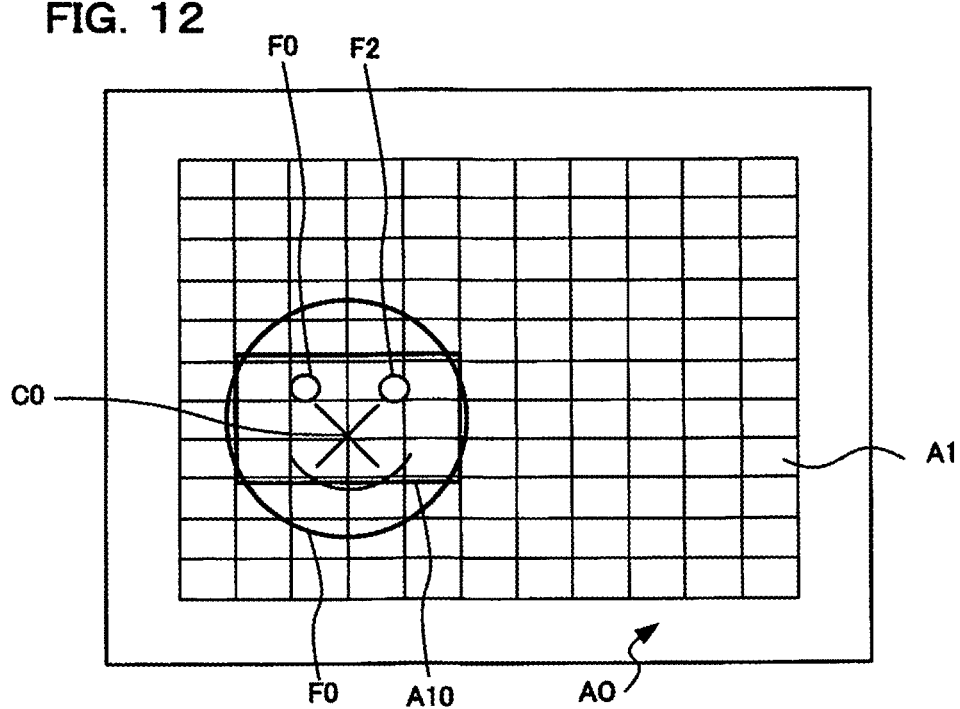
FIG. 12 is a schematic diagram showing one example of AF calculation execution range at the time of tracking AF for second area selection processing, in one embodiment of the present invention.

FIG. 12 is a schematic diagram showing one example of AF calculation execution range at the time of tracking AF. At the time of tracking AF, defocus amount is calculated within a 4×3 AF calculation execution range, as shown in FIG. 12, for example, with tracking coordinate C0 at the center. AF areas A1 are selected based on the defocus amount that has been calculated.

(Case of Face AF)

An AF calculation execution range at the time of face AF has AF areas A1 within the range in which a face that has been detected by the face detection circuit exists. Defocus amount is calculated in AF areas within the face detection range. AF areas A1 are selected based on the defocus amount that has been calculated. It should be noted that at the time of face AF in the second area selection processing, differing from the first area selection processing, processing that is specific to face AF is not performed. At the time of face AF in the second area selection processing, defocus amount is calculated within the face detection range for each of the vertical direction and horizontal direction, like the case for group target what was described above, for example. It should be noted that this description does not exclude processing specific to face AF being performed in the second area selection processing.

{Area Selection}

Selection of AF area in the second area selection processing (S31 in FIG. 2B) will be described with reference to the drawings.

(Overview of Area Selection)

With selection of AF area in the second area selection processing, first determination to determine whether or not a motion prediction formula has been established is first performed. Next, second determination to determine whether a drive direction of the focus lens 102a obtained from the motion prediction formula is the close-up direction or the infinity direction is performed. After that, it is determined whether or not a defocus amount satisfying various conditions exists, in the order first case, second case, third case.

(First Determination)

In the second area selection processing, the determination section 216b performs first determination as to whether or not a motion prediction formula is established. With the first determination, it is determined that a motion prediction formula is established when both a first condition and a second condition are satisfied. The first condition is existence of a given number or more of points of history information relating to defocus amount. For example, when history information within the previous second from the current time is 5 points or more, it is determined that the first condition is satisfied. The second condition is that, in a state where the first condition is satisfied, a number of points having deviation in defocus amount, from a primary prediction formula that has been calculated, that falls in a certain amount, is greater than or equal to 5. For example, it is determined that the second condition is satisfied when, within history information relating to defocus amount, history information within the previous second from the current time is 5 points or more, and a number of points which have a deviation defocus amount from a primary prediction formula that has been prediction falls in the range of 10Fδ or less is 5 points or more. It should be noted that as a motion prediction formula, as was described with reference to the flowcharts of FIG. 2A and FIG. 2B, results of a prediction formula that has been calculated based on ranging result up to one frame before is used. In the term Fδ, F represents FNo., and δ represents permissible circle of confusion. F is also known as F value, or aperture value. Generally, Fδ represents permissible depth. There may also be cases where Fδ is expressed as 1Fδ.

(Second Determination)

In the second area selection processing, the determination section 216b further performs second determination to determine whether a drive direction of the focus lens 102a obtained from the motion prediction formula is the close-up direction or the infinity direction. It should be noted that with this embodiment the close-up direction is made positive. Here, the close-up direction is a direction of moving the focus lens 102a from the infinity end towards the close-up end. Also, a case where a focus deviation direction is the near side is taken as a case where defocus amount is positive. At this time, if the subject is going from the infinity into the near side, a gradient of the motion prediction formula, with the vertical axis as lens pulse position and the horizontal axis as time, becomes positive. Obviously, depending on which direction is made positive, use of positive or negative for other values, and gradients etc. of the motion prediction formula may be changed.

(First Case)

Here, description will be given for selection of AF area in a first case. The first case includes a situation where it has been determined in the first determination that a motion prediction formula has been established, and it has been determined in the second determination that gradient of the motion prediction formula is positive. The first case may also include a situation where gradient of the motion prediction formula is zero.

Figure 13:
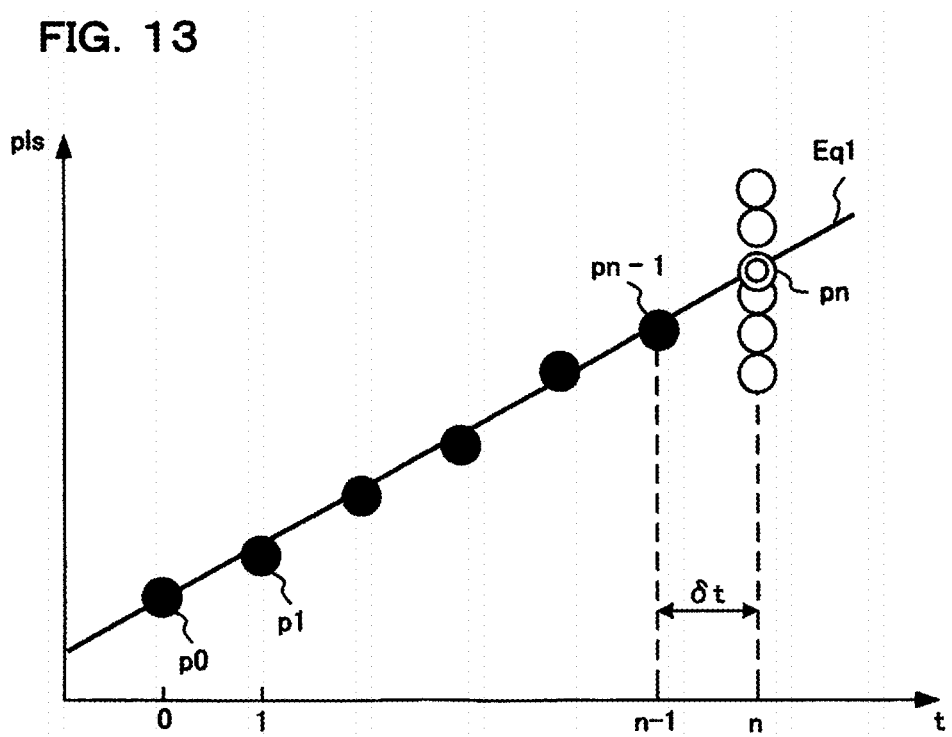
FIG. 13 is a schematic diagram showing one example of a selection of AF areas for a first case, of one embodiment of the present invention.

FIG. 13 is a schematic diagram showing one example of selection of AF area in the first case. In the graph of FIG. 13, the vertical axis represents lens pulse position for every AF area calculated by the processing of step S32 (S23), and the horizontal axis represents time. In the graph of FIG. 13, the plot shown by filled-in circles represents lens pulse positions that have been selected for every time δt, for example. That is, the flow represented by the filled-in circles is history of lens pulse positions that have been acquired from time 0 to time n-1. The solid line represents motion prediction formula Eq1 that has been calculated based on history of lens pulse position. Here, in order to simplify the description, a relational expression between lens pulse position and time is shown as one example of motion prediction formula Eq1. Here, time n is a time at which second area selection processing will be performed from now on. In the graph of FIG. 13 the plot shown by the circles that are not filled in and the double circle represents focus target position (lens pulse position) TLP corresponding to defocus amount for each AF area.

With the first case, a defocus amount corresponding to the focus target position TLP that is closest to the motion prediction formula Eq1, among the plurality of focus target positions TLP, is selected. For example, in the state shown in FIG. 13, a defocus amount corresponding to lens pulse position pn shown by the double circle is selected. This means that the first case can also be presented as selection of a defocus amount that was used in calculation of focus target position TLP that is closest to the motion prediction formula Eq1. It should be noted that with the first case it does not matter whether the defocus amount is positive or negative.

The first case is a case where the drive direction of the focus lens 102a is the close-up direction. That is, the first case is a case where the motion prediction formula Eq1 is established, as shown in the graph in FIG. 13, and the gradient of the motion prediction formula Eq1 is positive. At this time, an AF area that exhibits a defocus amount corresponding to the focus target position TLP closest to the motion prediction formula is selected.

(Second Case)

Here, description will be given for selection of AF area in a second case. The second case includes a situation where it has been determined in the first determination that a motion prediction formula has been established, and it has been determined in the second determination that gradient of the motion prediction formula is negative.

Figure 14:
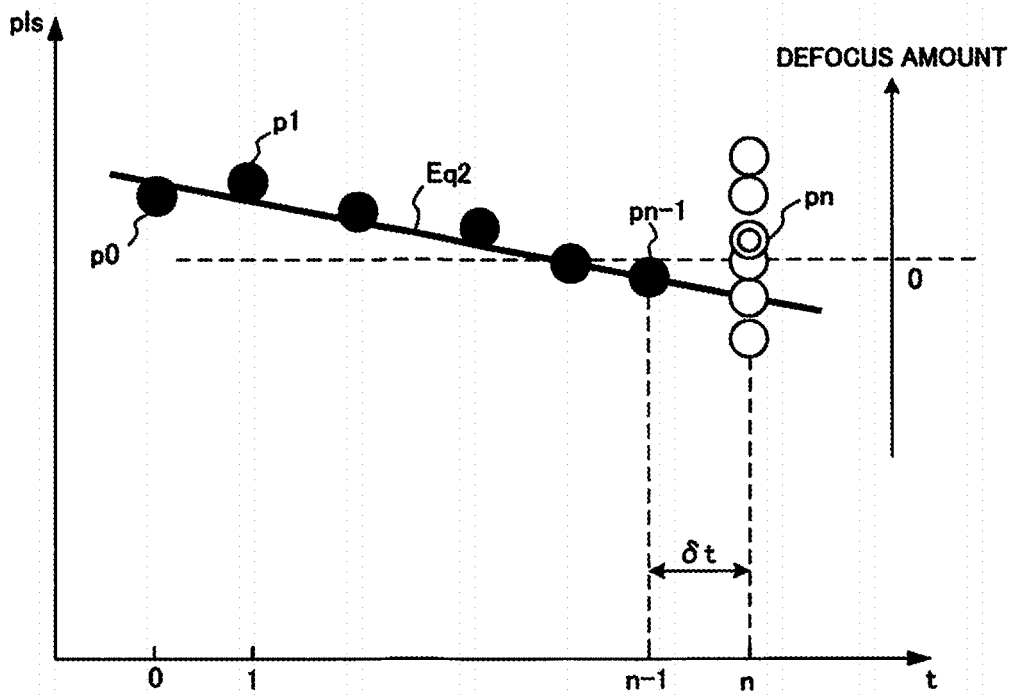
FIG. 14 is a schematic diagram showing one example of a selection of AF areas for a second case, of one embodiment of the present invention.

FIG. 14 is a schematic diagram showing one example of selection of AF area in the second case. Items respectively represented by the vertical axis and horizontal axis in the graph of FIG. 14, and items represented by respective plot classifications, are the same as those in the graph of FIG. 13. Also, the solid line in FIG. 14 represents motion prediction formula Eq2 that has been calculated based on history of lens pulse position. Here, in order to simplify the description, a relational expression between lens pulse position and time is shown as one example of motion prediction formula Eq2. It should be noted that although the vertical axis and the axis representing defocus amount in FIG. 14 are described on the same plane, they are axes for mutually different dimensions.

With the second case, third determination to determine whether or not there is a positive defocus amount that satisfies a third condition, and fourth determination to determine whether or not a fourth condition has been satisfied, are performed.

(Third Determination)

The third condition is represented by the relational expression shown in equation (3).

$$|D+|min \le |D-|min \times e \quad \text{equation (3)}$$

Here, |D+| min is a minimum value among absolute values of defocus amount that have a positive value. |D−| min is a minimum value among absolute values of defocus amount that have a negative value. e is a constant.

That is, in the third determination the determination section 216b determines, for defocus amount exhibited in an AF area that has been determined to have reliability, whether or not the defocus amount has a positive value that satisfies the third condition.

(Fourth Determination)

The fourth condition is that it is not face AF, and that sensitivity is set to higher than a predetermined value. Here, sensitivity is a parameter that can be set by the user. The sensitivity setting section 216c sets sensitivity in response to user operation, for example. Displays such as of an operation screen for sensitivity setting exist within a normal menu screen of the camera system, for example.

Specifically, in the fourth determination, the determination section 216b determines that it is a case that is not face AF, and where sensitivity has been set to higher than a predetermined value.

In the second case, the area selection section 216f selects an AF area exhibiting a minimum value of positive defocus amount, when it has been determined that the third determination and the fourth determination has been satisfied. It should be noted that there may also be cases where AF areas exhibiting a defocus amount of 0, for example, exist. At this time, with defocus amount=0, in the third determination it is determined that the third condition is satisfied.

The second case is a case where the drive direction of the focus lens 102a is the infinity direction. That is, the second case is a case where the motion prediction formula Eq2 is established, as shown in the graph in FIG. 14, and the gradient of the motion prediction formula Eq2 is negative. This time, and AF area exhibiting a positive defocus amount is preferentially adopted. By preferentially adopting an AF area with a positive defocus amount, it is made difficult to select an AF area in which a defocus amount has been calculated for managing to focus on a background, which is at the infinity side compared to the main subject.

It should be noted that the second case may also include a case where, among cases that are not applicable to the first case, it is determined in the first determination that the motion prediction formula is not satisfied. Here, a case where precision of the motion prediction formula is low is included in a case where the motion prediction formula is not satisfied. It should be noted that a case where precision of the motion prediction formula is low can be represented as a case where probability of the motion prediction formula is insufficient.

(Third Case)

Here, description will be given for selection of AF area in a third case. The third case is a case that is not applicable to the first case the second case. The third case includes a case where, with the motion prediction formula not satisfied, value of defocus amount having a positive value is large.

Figure 15:
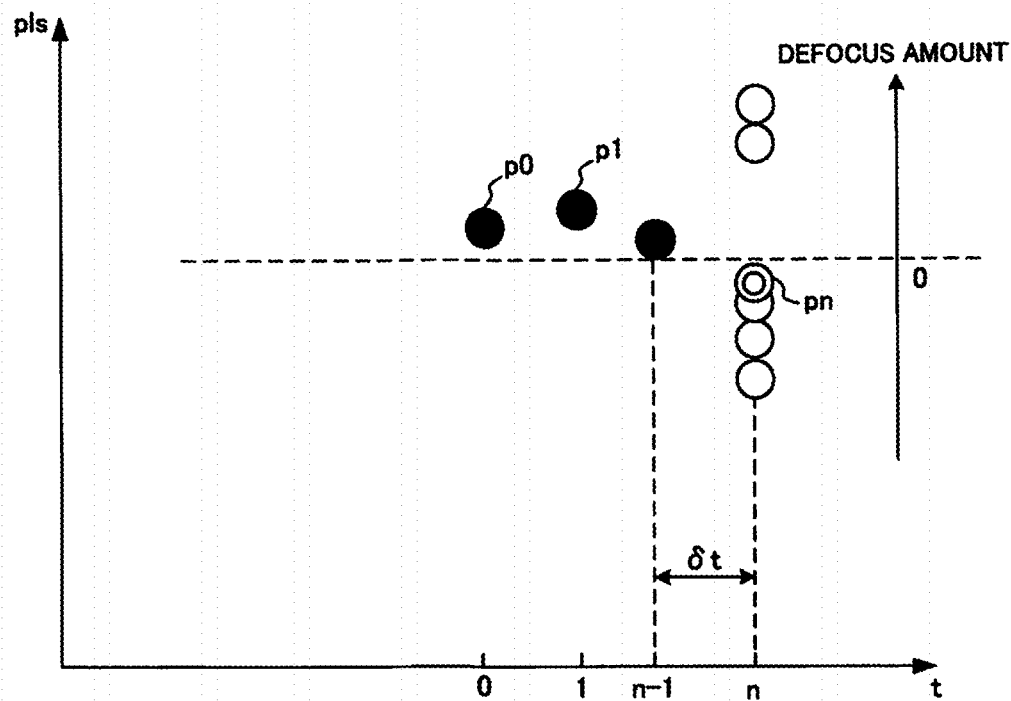
FIG. 15 is a schematic diagram showing one example of a selection of AF areas for a third case, of one embodiment of the present invention.

FIG. 15 is a schematic diagram showing one example of selection of AF area in the third case. Items respectively represented by the vertical axis, horizontal axis, and axis representing defocus amount in the graph of FIG. 15, and items represented by the dashed line and respective plot classifications, are the same as the descriptions in FIG. 14.

With the third case, among a plurality of focus target positions TLP, a focus target position TLP corresponding to a defocus amount exhibiting a minimum value, among absolute values of negative defocus amount, is selected. For example, in the state shown in FIG. 15, a lens pulse position pn shown by the double circle is selected. That is, with the third case an AF area exhibiting a defocus amount corresponding to the lens pulse position pn is selected.

As described above, with the second area selection processing of this embodiment, it is determined whether or not a defocus amount exists that satisfies respective cases in the order first case, second case, third case. This means that with the second area selection processing it becomes easy to adopt a defocus amount having a positive value. The reason that adopting a defocus amount having a positive value is facilitated is that for a mix of near and far subjects this prevents focusing on a background, that often exists further away than the subject. Accordingly, changes, such as to the above described determination sequence that is performed from the viewpoint of making it easy to adopt a positive defocus amount, have the same intention as this technology, and needless to say the same results can be obtained.

Also, the constant e described above in the second case is made 10 times. The reason for doing this is in order to ensure that a positive defocus amount is adopted as long as it is not an extremely large positive defocus amount. Also, the condition of "sensitivity=high" described in the second case designates a case that has been set so as to track a subject sensitively. The state of "sensitivity=high" is a state that is aimed at also tracking a subject that has abrupt acceleration. The sensitivity setting is considered for the purpose of proactively adopting a positive defocus amount even if a value of that defocus amount is large, such that it is easy to track a subject that has approached from far away to close in, for example.

<Determination as to Whether or not there is a Focused State (Within Focusing Range)>

Here, determination as to whether or not there is a focused state in step S15 and step S47 will be described in more detail. Determination of whether or not there is a focused state can also be expressed as determination as to whether or not a subject is within focusing range. This determination is mainly executed when it has not been determined that the 2nd release is on, after the second area selection processing. Specifically, with this embodiment a case where this determination is not executed during C-AF continuous shooting will be described as an example.

Figure 16:
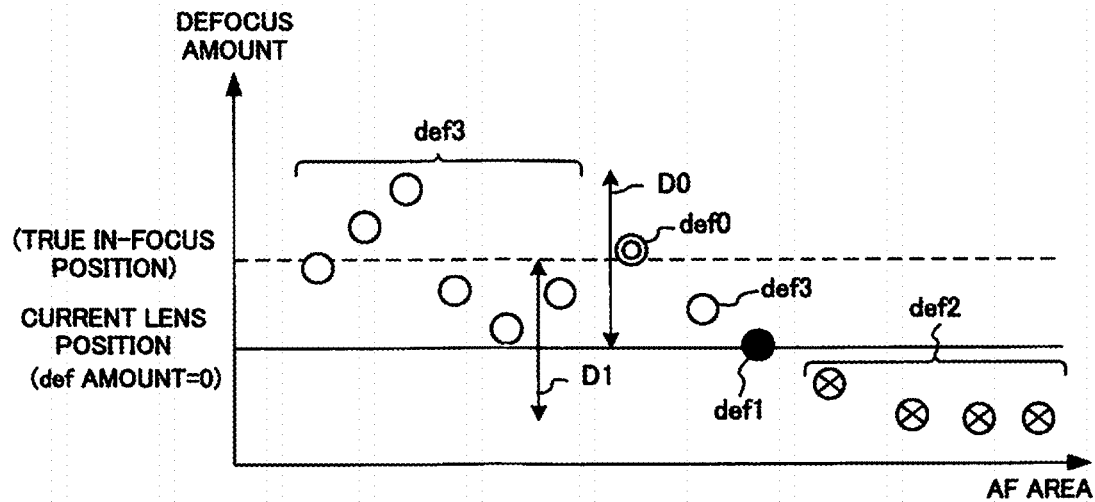
FIG. 16 is a schematic drawing showing one example of a relationship between defocus amount distribution and current lens position and true in-focus position, with respect to AF area, in a case where control is performed aiming at defocus amount=0, in one embodiment of the present invention.

First, one example of a situation that requires the focus adjustment device 1 of this embodiment will be described. FIG. 16 is a schematic drawing showing one example of a relationship between defocus amount distribution and current lens position and true in-focus position, with respect to AF area, in a case where control is performed aiming at defocus amount=0. Here, a true in-focus position means a position of the focus lens that is intended. It should be noted that, as described above, at the time of face AF, AF area selection is performed not with closest range priority, but with face center priority. Also, in the following description, a case where defocus amounts exhibited by respective AF areas are considered will be described as an example, but a case where respective phase difference detection directions contained in respective AF areas are considered can also be similarly executed, and similar effects obtained.

In the graph of FIG. 16, the vertical axis represents defocus amount on the horizontal axis represents AF area. The respective plots of def0, def1, def2, and def3 in FIG. 16 respectively represent defocus amounts that have been calculated in respective AF areas. The double circle plot def0 represents defocus amount calculated in an AF area that it is desired to be selected, the filled-in circle plot def1 represents defocus amount that has been selected, the plot def2 shown by circles with a cross inside represents defocus amounts that have been calculated for a background unwanted subject, and the plot def3 shown by circles that have not been filled in represents other defocus amounts. Also, in the graph of FIG. 16, the solid line represents current lens position with a current defocus amount of zero, the dashed line represents true in-focus position, the arrowed solid line Dl represents permissible depth for current lens position, and the arrowed solid line D0 represents permissible depth for true in-focus position. It should be noted that true in-focus position shown by the dashed line and permissible depth for the true in-focus position shown by the arrowed solid line D0 are values to be aimed at, at the time of focus adjustment by the focus adjustment device 1, but at the same time it goes without saying that they may be unknown information that has not been ascertained at the time of focus adjustment by the focus adjustment device 1.

Generally, setting of permissible depth for in-focus determination is, for example, −1Fδ to +1Fδ. However, in a situation where AF is executed for a subject that is a mix of near and far objects, such as shown in FIG. 16, in addition to the defocus amounts such as plot def0, plot def1, and plot def3, defocus amount that has been calculated in conformity with an unwanted subject of a background, such as plot def2, is also included in the range of permissible depth. This means that when the current lens position exists at a position of −1Fδ from the true in-focus position etc., because of variations in defocus amount that have been detected, defocus amount of an AF area that is offset slightly from the Af area of plot def0 that it is desired to select, such as plot def1, will be erroneously selected. Also, if defocus drive is mistakenly performed further to the negative side, based on a result of this selection, lens drive will gradually be performed towards the unwanted subject of the background resulting in this subject being mistakenly focused on, and there is a possibility that an AF operation with the main subject being focused on will not be appropriately realized.

For example, with continuous AF (C-AF) where AF and focusing are repeatedly performed on a subject that is moving, continuously tracking on a subject that is usually moving closer is important. Also, with the control processing for the focus adjustment device 1 of this embodiment, as was described above with reference to FIG. 2A to FIG. 2C, the lens drive (LD) in step S53 is executed based on the result of moving body estimation computation (S43) immediately before the actual exposure of step S55.

Accordingly the focus adjustment device 1 of this embodiment does not necessarily require the focus lens position to be within the permissible depth while the 1st release is being maintained. Also, with C-AF, not focusing on the background is particularly important, and the focus adjustment device 1 of this embodiment preferentially selects a defocus amount having a positive value, as shown in the second area selection processing.

Figure 17:
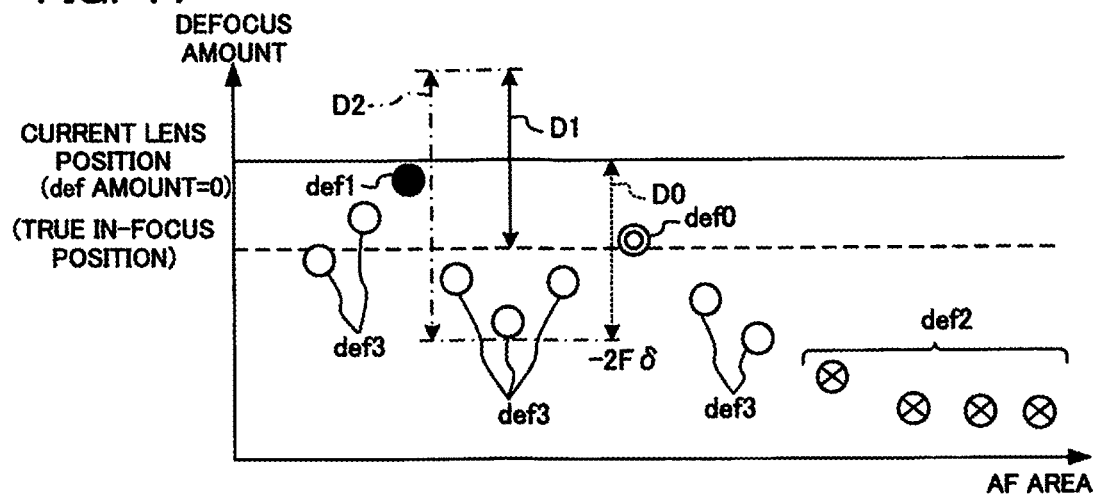
FIG. 17 is a schematic drawing showing one example of a relationship between defocus amount distribution and current lens position and true in-focus position, with respect to AF area, in a case where control is performed aiming at defocus amount=+1Fδ, in one embodiment of the present invention.

Accordingly, the focus adjustment device 1 of this embodiment performs control aimed at achieving, for example, defocus amount=+1Fδ, with the focus lens drive of step S49. FIG. 17 is a schematic drawing showing one example of a relationship between defocus amount distribution and current lens position and true in-focus position, with respect to AF area at this time. The following description will be given with reference to FIG. 17. Items respectively represented by the vertical axis, horizontal axis, solid line, dashed line, and arrowed solid line D1 in the graph of FIG. 17, and items represented by respective plot classifications, are the same as those in the graph of FIG. 16. Also, the arrowed dot and dash line D2 represents permissible depth for a current lens position in a case where control has been performed aimed at defocus amount=+1Fδ.

As was described above with reference to FIG. 16, particularly for subjects that are a mix of near and far objects, in cases such as where a defocus amount corresponding to an unwanted subject of the background has been incorrectly adopted, lens drive will be mistakenly performed to the infinity side from the true in-focus position. As a result, as shown in FIG. 17, the focus adjustment device 1 of this embodiment drives the focus lens by adding an offset component of, for example, "+1Fδ" so that it is possible to obtain a positive value of defocus amount from the true in-focus position shown by the dashed line, as shown by the solid line. This means that the focus adjustment device 1 of this embodiment can perform and achieve focus adjustment by correcting defocus amount exhibited by an AF area by a specified amount towards the positive side. In this way, the focus adjustment device 1 of this embodiment happens to adopt a defocus amount def1 that has been offset by +1Fδ from the true in-focus position due to variations in defocus amount that has been detected. Accordingly, with this technology it is possible to avoid erroneous detection of a defocus amount corresponding to an unwanted subject in the background, such as when lens drive (LD) has been performed aiming at defocus amount=0. Specifically, it is possible to prevent a defocus amount for an unwanted subject being adopted.

In this way, the focus adjustment device 1 of this embodiment preferentially selects a defocus amount having a positive value in the second area selection processing, such as performing control aimed at a defocus amount=+1Fδ, and performs setting of focusing range for the in-focus determination of step S47 by, for example, setting widely to the negative side such as −2Fδ to +1Fδ. This makes it possible for the focus adjustment device 1 of this embodiment to perform and achieve in-focus determination by correcting a threshold value for in-focus determination to the negative side. Specifically, for a subject that is a mix of near and far objects, a focusing range is set within a permissible depth, such as permissible depth that can be considered to be equivalent to permissible depth for a true in-focus position, and a permissible depth for a current lens position that has been offset driven. Lens drive is not performed in a range of −2Fδ to +1Fδ with respect to the current lens position. In this way, with this technology, while suppressing negative direction lens drive toward the background it is possible to make it difficult to select an AF area exhibiting a defocus amount with a background unwanted subject being focused on, and make it easy to select an appropriate AF area for which a defocus amount with a main subject being focused on has been calculated.

<Reference Determination Processing>

Here, the reference determination processing that is executed in step S37 will be described with reference to the drawings. As was described above, the lens pulse position is an absolute position, differing from the defocus amount which is a relative position. This means that in order to execute AF area selection based on lens pulse position corresponding to focus target position, it is necessary to have a reference position that constitutes a reference for evaluating lens pulse position. Specifically, it can be expressed that this processing is for the third area selection processing that performs AF area selection based on lens pulse position.

With this processing, update determination to determine whether or not to update reference position is performed. Update determination is performed for every frame. Update determination is performed over a number of frames. The update determination is performed based on reference change conditions in accordance with subject state. Determination of reference position is executed in the following sequence. It should be noted that determination and update of reference position are executed within a single frame.

As described above, reference determination processing is performed in step S37, and this reference determination processing updates reference position in accordance with result of target (object) range determination in the previous step S35. Specifically, update of reference position is performed in accordance with condition 1 to condition 3 described above.

If the result of the determination of target range in step S35 satisfies condition 1, reference position is updated only when a result within the target range (first priority range (area)) satisfies condition 4 below.

$$|Lop-St| \geq \qquad \text{(Condition 4)}$$

C5 here is a constant. Also, Lop means lens target position (focus target position) that is closest to the reference, and ST means reference position.

Also, if the result of determination of target range in step S35 satisfies condition 2, change of reference position is performed in accordance with the result of the target range (first priority range (area) and second priority range (area)), as will be described later. Also, if condition 3 is satisfied, change of reference position is performed, similarly to the case where condition 2 is satisfied, in accordance with result of target range (first priority range (area), second priority range (area), and third priority range (area)), as will be described later. Update of reference position in the case where condition 2 and condition 3 are satisfied is performed as follows.

At the time of commencement of reference determination processing the first time, for example, current position of the focus lens 102a is set as the reference position. Here, current position of the focus lens 102a can also be expressed as lens position during exposure.

(First Update Determination)

Figure 18:
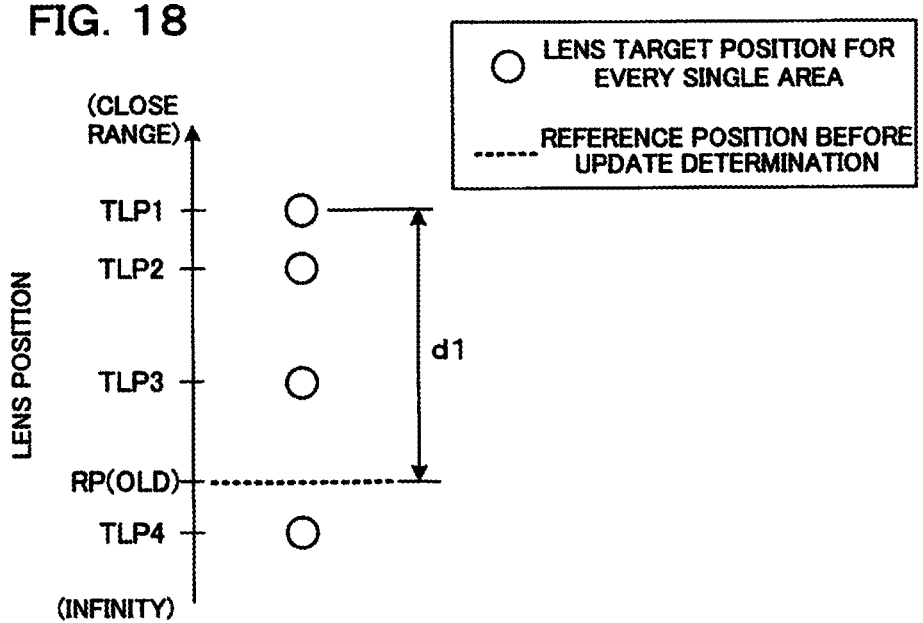
FIG. 18 is a drawing for describing first update determination that is performed based on first reference change conditions, in reference determination processing of one embodiment of the present invention.

First, first update determination is performed. FIG. 18 is a drawing for describing first update determination that is performed based on a first reference change condition. The vertical axis in FIG. 18 is lens pulse position. The circles in FIG. 18 represent focus target position TLP for each single area. At this time, respective focus target positions TLP are made positions TLP1, TLP2, TLP3 and TLP4 sequentially from the closest range. Also, the dashed line in FIG. 18 represents reference position RP before update determination. In the state shown in FIG. 18, the reference position RP before update determination is positioned between TLP3 and TLP4. In the following, description will be given of first update determination performed in the state shown in FIG. 18.

(First Reference Change Condition)

First update determination is performed based on the first reference change condition. The first reference change condition is a condition where it has been assumed that a subject is approaching. The first reference change condition is that a state where the following relational expression is satisfied continues for a specified number of frames or more. Here, the specified number of frames for this condition is a first number of times.

$$d1 \geq f1 \qquad \text{equation (4)}$$

$$d1 = TLP\_C - RP\_OLD \qquad \text{equation (5)}$$

Here, TLP_C is focus target position TLP at the closest range. TLP_C is TLP1 in the state shown in FIG. 18. RP_OLD is reference position RP before update determination. f1 is a constant. f1 is also a first threshold value.

Figure 19:
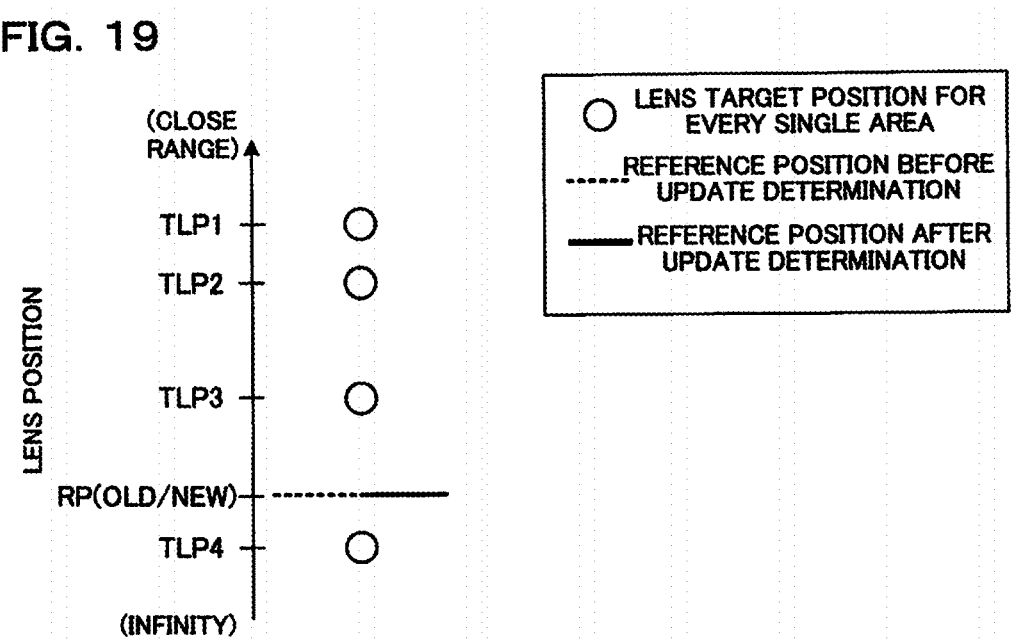
FIG. 19 is a drawing for describing reference position determined in a case where, in first update determination of reference determination processing, it has been determined that a first reference change condition has not been established, in one embodiment of the present invention.

FIG. 19 is a drawing for describing reference position RP determined in a case where it has been determined that the first reference change condition is not satisfied. In the first update determination, when it has been determined that the first reference change condition is not satisfied, the reference position RP_OLD before update determination is maintained, as shown by the solid line in FIG. 19. That is, a reference position RP_NEW after update determination is kept at reference position RP_OLD before update determination, without being changed.

Figure 20:
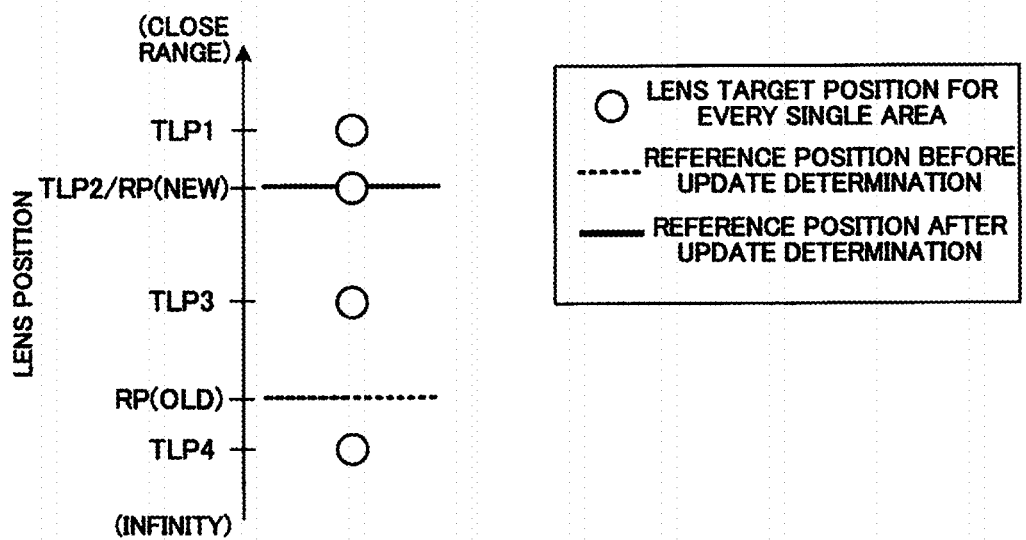
FIG. 20 is a drawing for describing reference position determined in a case where, in first update determination of reference determination processing, it has been determined that a first reference change condition has been established, in one embodiment of the present invention.

FIG. 20 is a drawing for describing reference position RP determined in a case where it has been determined that the first reference change condition has been satisfied. In the first update determination, when it has been determined that the first reference change condition has been satisfied, the position RP_NEW after update determination is updated to the position of TLP2, as shown by the solid line in FIG. 20. Here, TLP2 is the second closest focus target position TLP from the closest range.

In this way, with the first update determination, when the first reference change condition is satisfied the reference position is updated to the position of the second focus target position TLP from the closest range. At this time the focus target position TLP that is at the closest range becomes positioned further to the close-up end, with respect to the reference position RP that has been updated to the close-up end, continuously for a specified number of frames or more.

From this, when the first reference change condition is satisfied, it is not erroneous ranging, and it is possible to determine that there is a high possibility of detecting that the subject is approaching, or that the subject has approached.

It should be noted that although with the first update determination of this embodiment description has been given with an example of a case where the second focus target position TLP from the closest range is adopted as the reference position RP after update determination when the first reference change condition is satisfied, this is not limiting. When the first reference change condition is satisfied, it is also possible to adopt the focus target position TLP for the closest range as the reference position RP after update determination. In this case also, similar effects can be obtained as for the case where the second focus target position TLP from the closest range is adopted as the reference position RP after update determination. However, in a case where the second focus target position TLP from the closest range is adopted as the reference position RP after update determination, the effect of being able to suppress the influence on determination for subsequent frames is further obtained, even if the focus target position TLP for the closest range was a value that has been detected by erroneous ranging.

(Second Update Determination)

Figure 21:
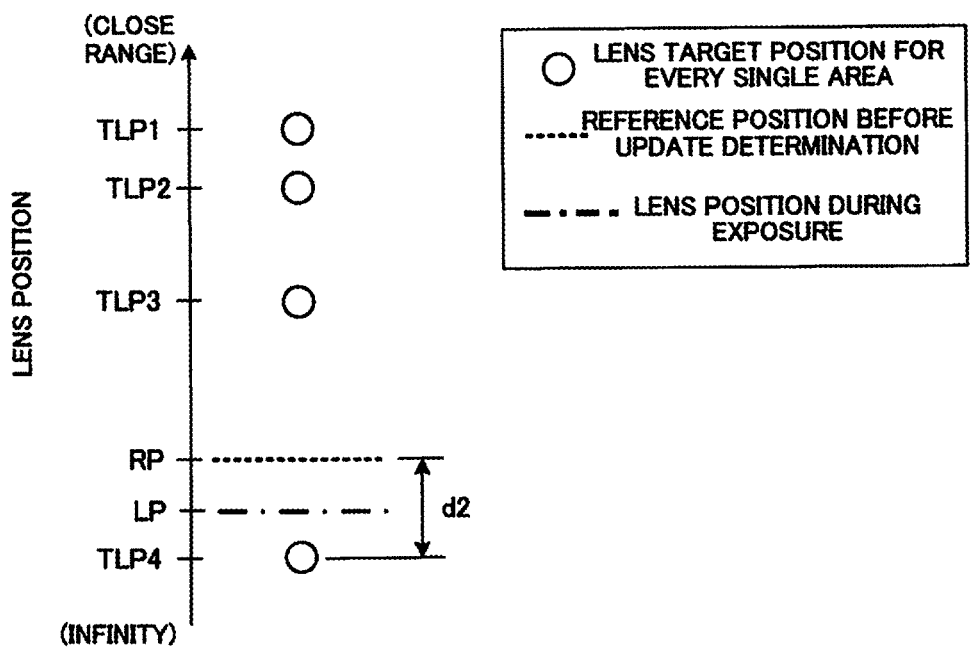
FIG. 21 is a drawing for describing second update determination that is performed based on a second reference change condition, in reference determination processing of one embodiment of the present invention.

Second update determination is performed continuously from the first update determination, in the same frame as for the first update determination. FIG. 21 is a drawing for describing second update determination that is performed based on a second reference change condition. However, for the purposes of description, the state shown in FIG. 21 shows states of frames that are different to the frames described above with reference to FIG. 18. In FIG. 21 items respectively represented by the vertical axis and dashed line are the same as in FIG. 18. The dot and dash line in FIG. 21 represents lens position LP during exposure. In the state shown in FIG. 21, the reference position RP before update determination is positioned between TLP3 and TLP4. Also the lens position LP during exposure is positioned between the reference position RP before update determination, and TLP4. In the following, description will be given of second update determination performed in the state shown in FIG. 21.

(Second Reference Change Condition)

Second update determination is performed based on the second reference change condition. The second reference change condition is a condition where it is been assumed that the subject has moved away toward the infinity side. The second reference change condition is that a state where the following relational expression is satisfied continues for a specified number of frames more. Here, the specified number of frames for this condition is a second number of times. The second number of times may be the same as the first number of times, or may be different.

$$d2 \le f2 < 0 \quad \text{equation (6)}$$

$$d2 = TLP\_R - RP\_OLD \quad \text{equation (7)}$$

Here, TLP_R is a focus target position TLP that is closest to the reference position RP. TLP_R is TLP4 in the state shown in FIG. 21. RP_OLD is reference position RP before update determination. f2 is a constant of less than 0. f2 is also a second threshold value.

Figure 22:
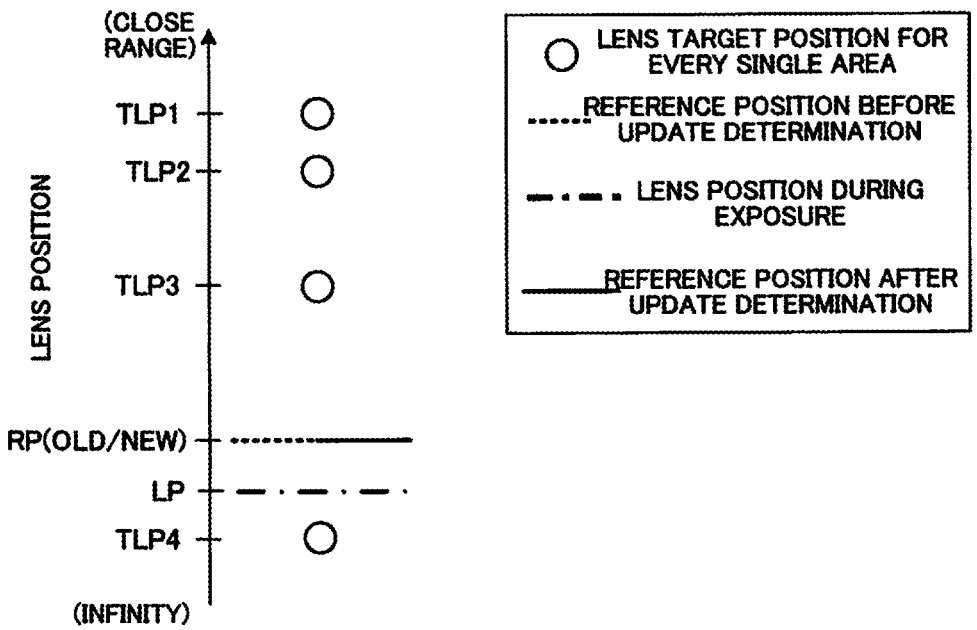
FIG. 22 is a drawing for describing reference position determined in a case where, in second update determination of reference determination processing, it has been determined that a second reference change condition has not been established, in one embodiment of the present invention.

FIG. 22 is a drawing for describing reference position RP determined in a case where it has been determined that the second reference change condition is not satisfied. In the second update determination, when it has been determined that the second reference change condition is not satisfied, the reference position RP_OLD before update determination is maintained, as shown by the solid line in FIG. 22. That is, a reference position RP_NEW after update determination is kept at reference position RP_OLD before update determination, without being changed.

Figure 23:
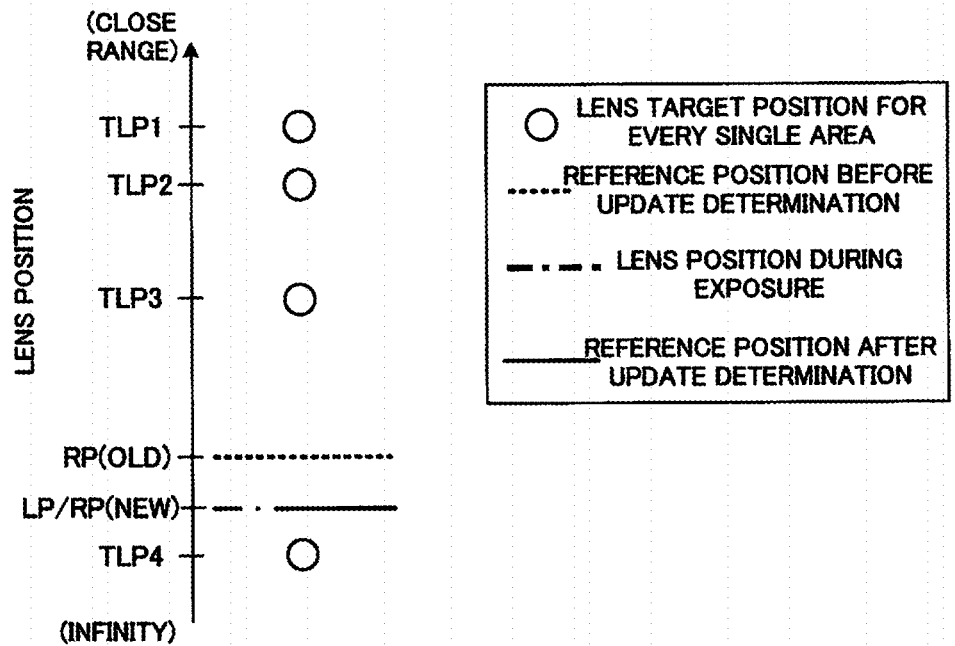
FIG. 23 is a drawing for describing reference position determined in a case where, in second update determination of reference determination processing, it has been determined that a second reference change condition has been established, in one embodiment of the present invention.

FIG. 23 is a drawing for describing reference position RP determined in a case where it has been determined that the second reference change condition has been satisfied. In the second update determination, when it has been determined that the second reference change condition has been satisfied, the position RP_NEW after update determination is updated to the position of lens position LP during exposure, as shown by the solid line in FIG. 23. Here, the lens position LP during exposure is a lens position that has been driven to in accordance with a motion prediction formula.

In this way, with the second update determination, when it has been determined that the second reference change condition is satisfied, the reference position is updated to the position of the lens position LP during exposure. At this time, the first reference change condition is not satisfied, and focus target position TLP that is closest to the reference position RP is located continuously for a specified number of frames or more further towards the infinity side, with respect to the reference position RP that has been updated to the infinity side. From this, when it has been determined that the second reference change condition is satisfied, it is possible to determine that there is a high possibility of detecting that the subject is moving away, or that the subject has moved away. That is, since, in the AF area selection, an AF area at the infinity side should have been selected for a specified number of frames until it is determined that the second reference change condition is satisfied, with the second update determination of this embodiment the reference position is changed in accordance with motion prediction.

(Third Update Determination)

Figure 24:
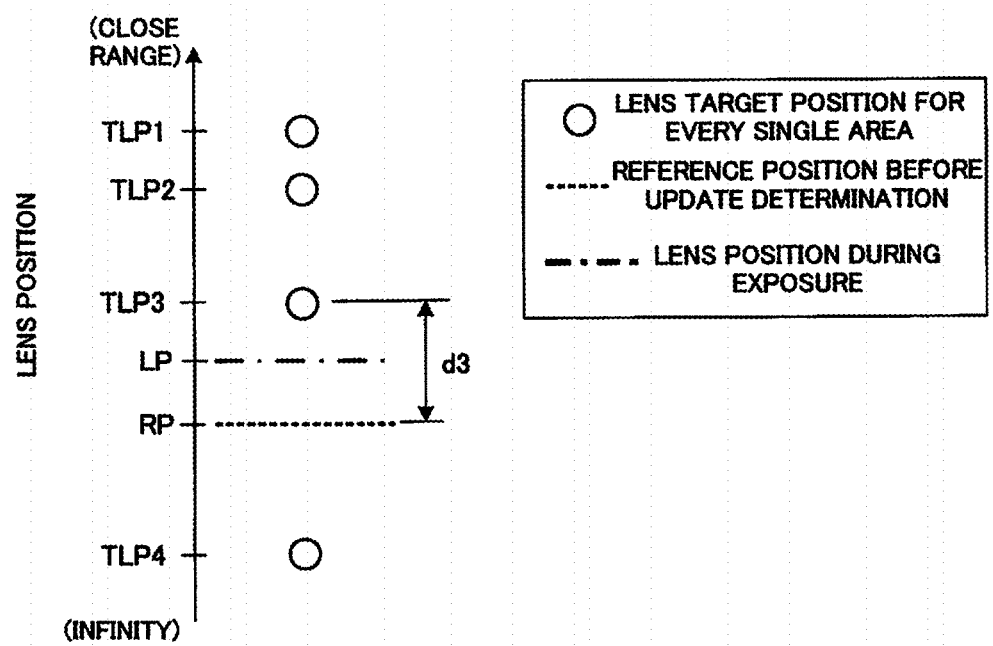
FIG. 24 is a drawing for describing third update determination that is performed based on a third reference change condition, in reference determination processing of one embodiment of the present invention.

Third update determination is performed continuously from the second update determination, in the same frame as for the first update determination and the second update determination. FIG. 24 is a drawing for describing third update determination that is performed based on a third reference change condition. However, for the purposes of description, the state shown in FIG. 24 shows states of frames that are different to the frames described above with reference to FIG. 18 or FIG. 21. In FIG. 24 items respectively represented by the vertical axis, circles, dashed line, and dot and dash line are the same as in FIG. 21. In the state shown in FIG. 24, the reference position RP before update determination is positioned between TLP3 and TLP4. Also, the lens position LP during exposure is positioned between TLP3 and the reference position RP before update determination. In the following, description will be given of third update determination performed in the state shown in FIG. 24.

(Third Reference Change Condition)

Third update determination is performed based on the third reference change condition. The third reference change condition is a condition that assumes a time when a subject has been switched, or when a subject is not held for a specified number of frames or more. Here, when the subject is not held for a specified number of frames or more, is when velocity of the subject is fast, for example. The third reference change condition can also be expressed as a condition for compensating for the first reference change condition and the second reference change condition. The third reference change condition is that the following relational expression is satisfied.

$$d3 \geq f3 \quad \text{equation (8)}$$

$$d3 = |TLP\_R - RP\_OLD| \quad \text{equation (9)}$$

Here, TLP_R is a focus target position TLP that is closest to the reference position RP. TLP_R is TLP3 in the state shown in FIG. 24. RP_OLD is reference position RP before update determination. f3 is a constant. f3 is also a third threshold value.

Figure 25:
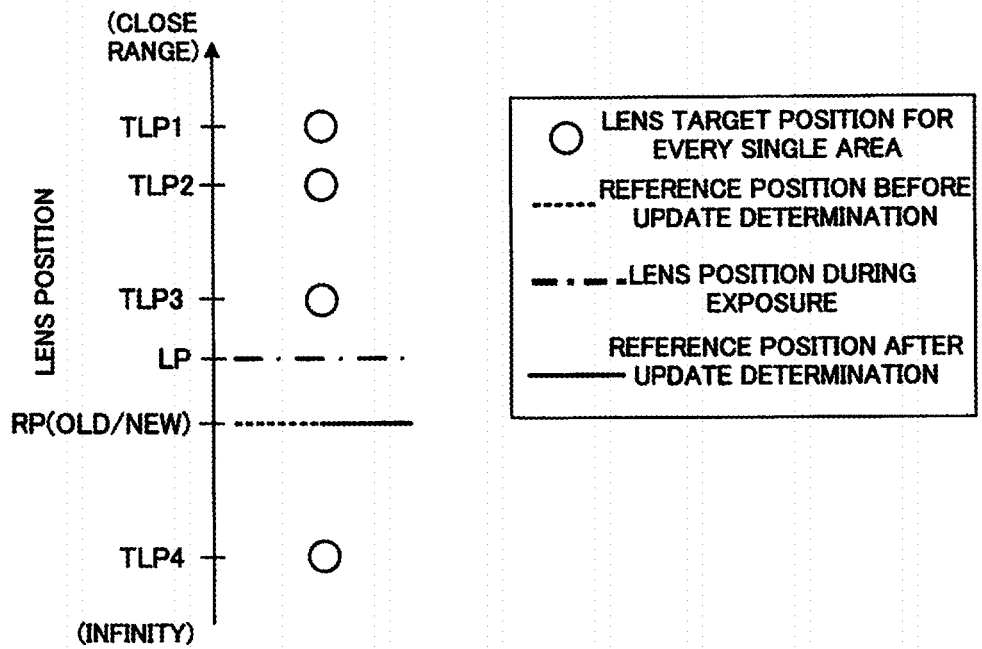
FIG. 25 is a drawing for describing reference position determined in a case where, in third update determination of reference determination processing, it has been determined that a third reference change condition has not been established, in one embodiment of the present invention.

FIG. 25 is a drawing for describing reference position RP determined in a case where it has been determined that the third reference change condition is not satisfied. In the third update determination, when it has been determined that the third reference change condition is not satisfied, the reference position RP before update determination is maintained, as shown by the solid line in FIG. 25. That is, a reference position RP_NEW after update determination is kept at reference position RP_OLD, before update determination, without being changed.

Figure 26:
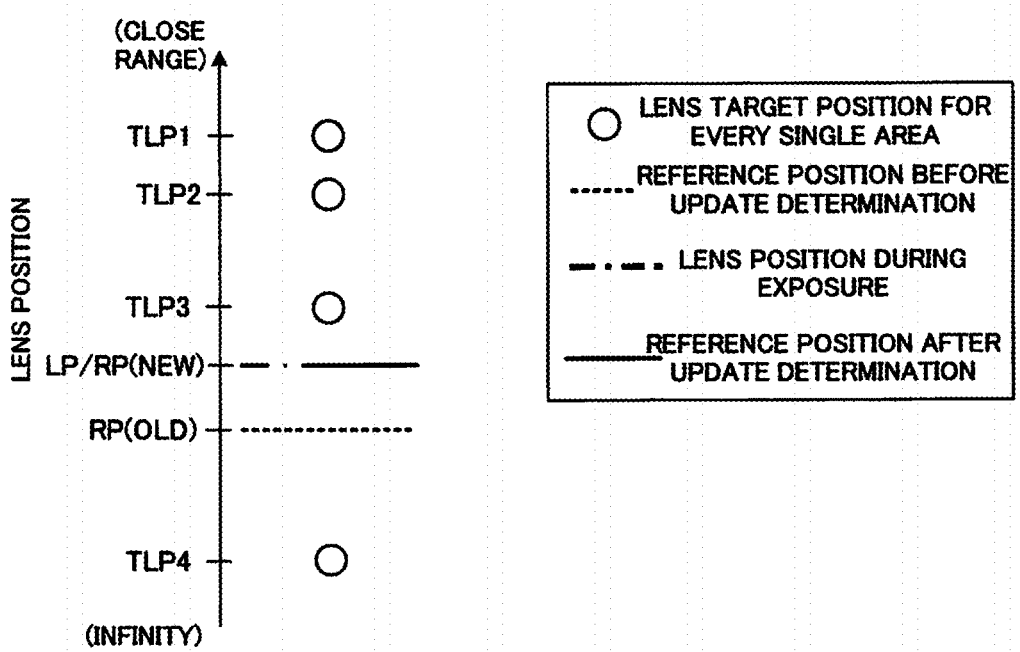
FIG. 26 is a drawing for describing reference position determined in a case where, in third update determination of reference determination processing, it has been determined that a third reference change condition has been established, in one embodiment of the present invention.

FIG. 26 is a drawing for describing reference position RP determined in a case where it has been determined that the third reference change condition has been satisfied. In the third update determination, when it has been determined that the third reference change condition has been satisfied, the position RP_NEW after update determination is updated to the position of lens position LP during exposure, as shown by the solid line in FIG. 26. Here, the lens position LP during exposure is a lens position that has been driven to in accordance with a motion prediction formula.

In this way, with the third update determination, when it has been determined that the third reference change condition is satisfied, the reference position is updated to the position of the lens position LP during exposure. At this time, the first reference change condition and the second reference change condition are not satisfied, and a focus target position TLP does not exist close to the reference position RP. From this, when it has been determined that the third reference change condition is satisfied, it is possible to determine that there is a high possibility of detecting that the subject has been switched, or that the subject speed is fast. That is, when it has been determined that the third reference change condition is satisfied, it is a state where it is unclear which focus target position TLP is correct. Accordingly, with the third update determination of this embodiment, reference position is updated in accordance with motion prediction, assuming that it will be determined that some reference change conditions will be satisfied in a few of frames.

(Fourth Update Determination)

Fourth update determination is performed continuously from the third update determination, in the same frame as for the first update determination, the second update determination, and the third update determination. A fourth reference change condition is a condition where a stationary subject has been assumed. With the fourth update determination, it is determined that the fourth reference change condition is satisfied when it has been determined that any of the conditions of the first reference change condition, the second reference change condition, and the third reference change condition is not satisfied. At this time, a reference position RP after update determination is kept at reference position RP before update determination, without being changed.

If it has been determined that the fourth reference change condition is satisfied, namely, when it has been determined that any condition of the first reference change condition, second reference change condition, and third reference change condition is not satisfied, it is determined that the subject is in the vicinity of an in-focus position. Accordingly, when it has been determined that the fourth reference change condition is satisfied, since the subject is a stationary subject and not a moving subject, there is no need to change the reference position.

It should be noted that values for f1, f2 and f3 are respectively multiples of 1Fδ. f1, f2, and f3 may be, for example, 1.5Fδ, or −2Fδ respectively. Here, 1Fδ represents depth of field. It should be noted that values for f1, f2, and f3 may be respectively determined in accordance with, for example, sensitivity setting, aperture value (AV value), and ISO sensitivity (SV value). For example, when sensitivity is high, values of f1 and f3 are changed to become small and the value of f2 is changed to become large, so as to perform reference change more sensitively. At this time, the value of f2 is changed from −1.5Fδ to −1Fδ, for example. For example, when sensitivity is low, values of f1 and f3 are changed to become large and the value of f2 is changed to become small, so as to perform reference change less sensitively. At this time, the value of f2 is changed from −1Fδ to −1.5Fδ, for example. For example, when an AV value or SV value is high, since it is assumed that there will be a drop in ranging precision, values are changed so that values for f1 and f3 become large, and f2 becomes small. At this time, the value of f2 is changed from −1Fδ to −1.5Fδ, for example.

It should be noted that although it has been described that when the first reference change condition has been satisfied the reference position RP is changed to a second focus target position TLP from the closest range, or to a focus target position TLP at the closest range, this is not limiting. Reference position RP after update determination may be set in accordance with AV value or SV value, for example. When AV value or SV value are high, it is easy for erroneous ranging to occur. For this reason, for example, when AV value or SV value are high, the reference position RP after update determination is changed to a third focus target position TLP from the closest range.

It should be noted that the specified number of frames, specifically the number of continuous frames, is determined in accordance with sensitivity setting, for example. For example, when sensitivity is high the specified number of frames is reduced, so as to perform reference change more sensitively. For example, when sensitivity is low the specified number of frames is increased, so as to perform reference change less sensitively. Regardless of the number of frames, it is possible to reduce the influence of erroneous ranging results by performing reference determination processing across a number of frames.

<Third Area Selection Processing>

Next, the third area selection processing that is executed in step S39 will be described in further detail with reference to the drawings. With the third area selection processing AF area is selected based on a reference position that may sometimes be updated by reference determination processing, and a lens pulse position which is an absolute position. This processing is executed for every frame, after reference determination processing. This processing is executed in the sequence described in the following.

Reference position determination processing is executed in step S37 (S75, S81, S86) described above, and in this third area selection processing an area is selected in accordance with a result of the target range determination of step S35 (S71, S73, S79) before that. Specifically, third area selection processing is performed in accordance with the above described condition 1 to condition 3.

In the target (object) range determination, if condition 1 has been satisfied then an area is selected within the target (object) range (first priority range (area)) (S73: Yes). Also, if condition 2 has been satisfied an area is selected in accordance with a result of target (object) range (first priority range (area) and second priority range (area)), as will be described later (S79: Yes). Also, if condition 3 is satisfied an area is selected in accordance with result of target (object) range (first priority range (area), second priority range (area), and third priority range (area)), similarly to the case where condition 2 is satisfied, as will be described later (S79: No). Area selection processing in the case where condition 2 and condition 3 are satisfied is performed as follows.

(Determination Based On First Area Selection Condition)

First, determination is performed based on a first area selection condition. The first area selection condition is a condition where it has been assumed that a subject is approaching. The first area selection condition is that there is a frame in which the first reference change condition has been satisfied. That is, with this determination it is determined whether or not there is a frame in which the first reference change condition has been satisfied.

In a case where it has been determined that the first area selection condition is satisfied, that is in a case where it has been determined that there is a frame in which the first reference change condition has been satisfied, an AF area is selected where a focus target position TLP that has been obtained is closest to a reference position RP and has been updated. This is based on the fact that in the reference determination processing, when it has been determined that the first reference change condition has been satisfied, the reference position is updated to a position of a focus target position TLP at the near side. Accordingly, with this determination, an AF area that outputs a focus target position TLP closest to the reference position RP that has been updated is selected. For example, in a frame for which the first reference change condition has been satisfied, reference position is updated to the second closest focus target position TLP from the closest range. That is, when the first area selection condition is satisfied, and AF area that outputs a second focus target position TLP from the closest range is selected. It should be noted that in a case where a central area is made the target (S73), there is only a single AF area, and so the central area is selected.

(Determination Based On Second Area Selection Condition)

Next, determination is performed based on a second area selection condition. This determination is performed when it has not been determined that the first area selection condition is satisfied. The second area selection condition is a condition where it has been assumed that a subject is approaching, similarly to the first area selection condition. The second area selection condition is that a motion prediction formula is established, and that the motion prediction formula has a gradient of greater than or equal to a specified positive value. Specifically, with this determination, it is determined whether or not a motion prediction formula is established, and a gradient of the motion prediction formula is greater than or equal to a specified positive value. It should be noted that if the near side is made positive, the second area selection condition can also be expressed as the fact that a motion prediction formula having a gradient of greater than or equal to a positive specified threshold value is established. Here, the positive specified threshold value is 0.05, for example. At this time, if the near side is made positive, the second area selection condition can be expressed as a motion prediction first order equation, having a gradient g that satisfies a relationship of g>0.05, being established.

In the event that it has been determined that the second area selection condition has been satisfied, specifically, in the event a motion prediction formula is established and it has been determined that a gradient of the motion prediction formula is greater than equal to a specified positive value, an AF area that outputs a second focus target position TLP from the closest range is selected. This is based on the fact that when the second area selection condition is satisfied, for example, it can be considered that while a subject is approaching there is a shortage in frames occupied for a specified number of frames, and so the first reference change condition of the reference determination processing is not satisfied. It should be noted that when the second area selection condition is satisfied, for example, it can be considered that while a subject is approaching it is not approaching fast to an extent that $d1 \geq f1$ is satisfied, and so the first reference change condition of the reference determination processing is not satisfied. It should be noted that with this determination also, similarly to the first update determination of the reference determination processing, an AF area that outputs a focus target position TLP for the closest range may also be selected. It should be noted that in a case where a central area is made the target (object) range (S73), there is only a single AF area, and so the central area is selected.

(Determination Based On Third Area Selection Condition)

Next, determination is performed based on a third area selection condition. This determination is performed when, in determination based on the second area selection condition, a motion prediction formula has been established, and it has not been determined that a gradient of the motion prediction formula is greater than or equal to a specified positive value. That is, this determination is performed when the first area selection condition and the second area selection condition are not satisfied.

(Third Area Selection Condition)

The third area selection condition is a condition where it has been assumed that a subject is approaching, similarly to the first area selection condition and the second area selection condition. The third area selection condition can also be expressed as a condition for compensating for the first area selection condition under the second area selection condition. The third area selection condition is that a plurality of focus target positions TLP exist that satisfy the relational expression described below, and that the state where the relational expression is satisfied continues for a specified number of frames or more. That is, with this determination, it is determined whether or not a plurality of focus target positions TLP exist that satisfy the relational expression described below, and whether or not the state where the relational expression is satisfied continues for a specified number of frames or more.

$$d4 \geq f4 \qquad \text{equation (10)}$$

$$d4 = \text{TLP} - RP\_NEW \qquad \text{equation (11)}$$

Here, RP_NEW is the reference position RP after update determination. f4 is a constant. The third area selection condition can also be expressed, with this determination, as determination as to whether or not a state where the relational expression described below is satisfied continues for a specified number of frames.

$$n(d4 \geq f4) \geq 2 \qquad \text{equation (12)}$$

Here, n (d4≥f4) is a number of focus target positions TLP that satisfy d4≥f4.

In the event that it is determined that the third area selection condition is satisfied, namely, in the event that it has been determined that a state where equation (12) is satisfied continues for specified number of frames or more, then similarly to when it has been determined that third reference change condition is satisfied, it is a state where it is unclear whether there is any correct focus target position TLP. Accordingly, an AF area that outputs a focus target position TLP at the near side that is closest to the reference position RP that has been changed in accordance with motion prediction, is selected. Specifically, an AF area that outputs a minimum focus target position TLP, among focus target positions TLP that are larger than the reference position RP, is selected.

(Determination Based On Fourth Area Selection Condition)

Next, determination is performed based on a fourth area selection condition. This determination is performed in the event that it has not been determined that a state where equation (12) is satisfied continues for a specified number of frames or more. That is, this determination is performed when the first area selection condition, the second area selection condition, and the third area selection condition are not satisfied. The fourth area selection condition is a condition that assumes a stationary subject or a moving subject that is moving toward the infinity side. With this determination, it is determined that the fourth area selection condition is satisfied when it has been determined that none of the conditions of the first area selection condition, the second area selection condition, and the third area selection condition have been satisfied.

When it has been determined that the fourth area selection condition has been satisfied, namely, when it has been determined that none of the first area selection condition, the second area selection condition, and the third area selection condition have been satisfied, it can be determined that the subject is not a moving subject that is approaching. When it has been determined that the fourth area selection condition is satisfied, an AF area that outputs a focus target position TLP that is closest to the reference position RP is selected. Here, the fact that an AF area that outputs a focus target position TLP at the infinity side is not selected is in order to prevent background focusing. However, in a case where there is a moving subject that is moving to the infinity side, in the reference determination processing the reference position RP is updated to the infinity side.

It should be noted that although it has been described that when the first area selection condition has been an AF area is selected that outputs a second focus target position TLP from the closest range, or a focus target position TLP at the closest range, this is not limiting. Which AF area is to be selected based on which order of the closest focus target position TLP from the closest range is output from a plurality of AF areas can be set in accordance with AV value or SV value, for example. When AV value or SV value is high, vignetting of AF light flux is increased, or a noise component in image data is increased, making it easy for erroneous ranging to occur. For this reason, when AV value or SV value are higher than respective specified values, for example, they may be changed to select an AF area that outputs the third focus target position TLP from the closest range.

<One Example Of Reference Position Determination Processing And Third Area Selection Processing>

Here, one example of the determination of reference position RP in the reference position determination processing (S75, S81, S85) and AF area selection in the third area selection processing (S77, S83, S87) will be described with reference to the drawings. It should be noted that respective drawings that are referenced in the following description are respectively schematic drawings, and lengths and aspect ratios etc. do not necessarily coincide. In the following, a case where reference position RP before update for the first frame is current lens pulse position of the focus lens 102a, and a specified number of frames is three frames, will be described as an example. In the following, in order to simplify the description, counters (c1, c3, c3, c4) are used. c1 is a counter representing a number of frames for which the first reference change condition (first area selection condition) is continuously satisfied. c2 is a counter representing a number of frames for which the second reference change condition (second area selection condition) is continuously satisfied. c3 is a counter representing a number of frames for which the third reference change condition (third area selection condition) is continuously satisfied. c4 is a counter representing a number of frames for which the third area selection condition is continuously satisfied. For example, when c1 reaches 3, when c2 reaches 3, or when c3 reaches 1, counters are reset. Also, in the following operation, at the time of commencing reference determination processing for the first frame, counters are initialized (c1, c2, c3, c4)=(0, 0, 0, 0).

(Operation For Stationary Subject)

Figure 27A:
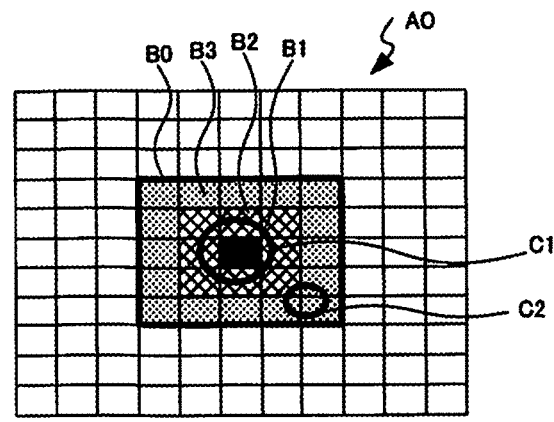
FIG. 27A to FIG. 27C are graphs showing one example of focus adjustment operation in the case of shooting a stationary subject, in a focus adjustment device of one embodiment of the present invention.

One example of focus adjustment operation when shooting a stationary subject will be described using FIG. 27A to FIG. 27C. FIG. 27A shows position of the subject within a photographing screen. In FIG. 27A also, similarly to FIG. 6A, 121 AF areas are arranged within the overall AF area A0, and the first priority range (area) B1, second priority range (area) B2 and third priority range (area) B3 are set within the set range (area) B0 for focus adjustment. With the example shown in FIG. 27A, there are two subjects within the set area B0 for focus adjustment, and of those two subjects one is a main subject C1 that the user is intending to photograph, and the other is an unwanted subject C2 that the user does not intend to photograph.

Figure 27B:
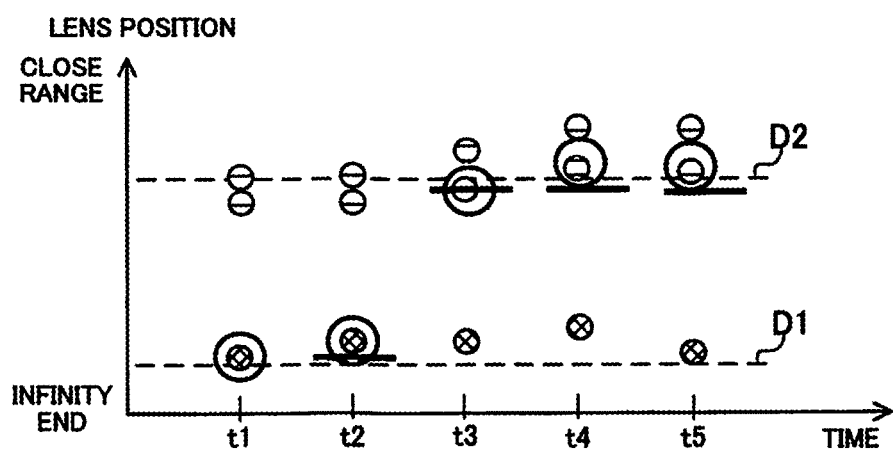
Figure 27C:
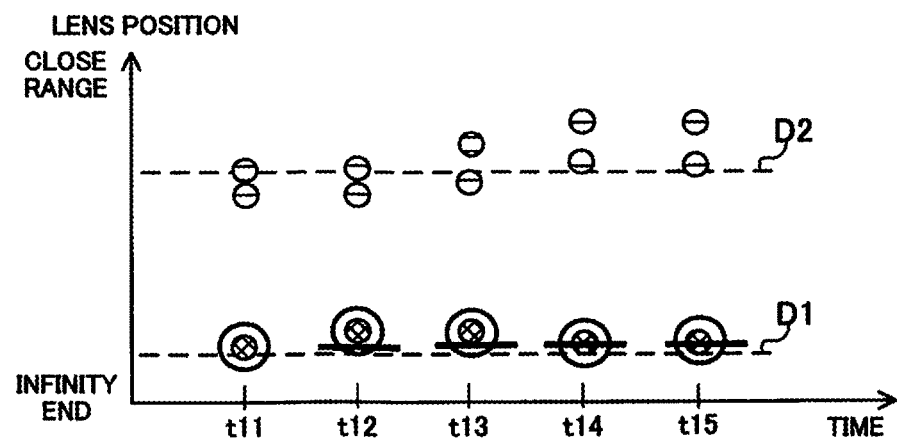

FIG. 27B and FIG. 27C Show one example of focus adjustment operation when shooting with the focus adjustment device. In FIG. 27B and FIG. 27C, the horizontal axis represents passage of time, and the vertical axis represents position of the focus lens. The circle marks in the drawings represent lens target positions for each single AF area. As was described above, there are 121 AF areas, but only 3 AF areas are shown in FIG. 27B and FIG. 27C, for the purposes of simplification. Also, the fact that there are horizontal lines within circle marks corresponding to a single AF area corresponds to ranging results for the unwanted subject C2, and the fact that there are dotted patterns within circle marks corresponds to ranging result for the main subject C1. Also, at each time, large circles represent AF area that has been selected from among a plurality of AF areas. At times t2 to t5, the bold cross bars represent reference position that was used for each frame. Dashed line D1 represents lens position corresponding to the main subject C1, and dashed line D2 represents lens position corresponding to the unwanted subject C2.

FIG. 27B shows one example of a focus adjustment operation in a case where the first, second, and third priority ranges (areas) are not set within the set range (area) B0 for focus adjustment. With this example, at time t1 and time t2, an AF area corresponding to the main subject C1 is selected for focus adjustment, and reference position corresponding to the main subject C1 is used. However, at times t3, t4 and t5, AF area corresponding to the unwanted subject C2 is selected, and reference position corresponding to the unwanted subject C2 is used. This is because since there is no setting of the first, second, and third priority ranges (areas) and it is possible to select all AF areas within the set range (area) B0, as a result of a difference between focus target position TLP at the closest range at time t3 and the reference position at time t2 exceeding a predetermined value, reference position was changed at time t3. This is also because an AF area of a second closest focus target position TLP from the closest range was selected at time t3. In this way, with the example shown in FIG. 27B, since priority ranking is not set within the set area B0, there is a high possibility of focusing on an unwanted subject that is at the near side.

The example shown in FIG. 27C is a case where the first, second, and third priority ranges (areas) have been set within the set range (area) B0 for focus adjustment, as was described for this embodiment. With this example, at each of times t11 to t15 an AF area (B1) that satisfies condition 1 and always corresponds to the main subject C1 is selected, and a reference position used in selection for every frame conforms to the main subject position D1. In this way, in the example shown in FIG. 27C, by prioritizing vicinity of the center (B1) within the set area B0 it is possible for the user to perform focusing on the subject that they intend to shoot.

(Operation For Moving Subject)

Figure 28A:
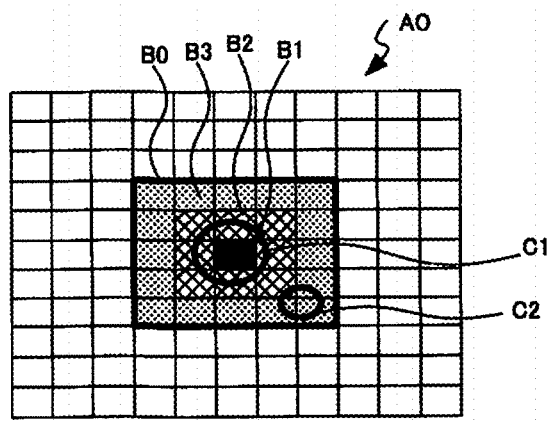
FIG. 28A to FIG. 28C are graphs showing one example of focus adjustment operation in the case of shooting a moving subject, in a focus adjustment device of one embodiment of the present invention.
Figure 28B:
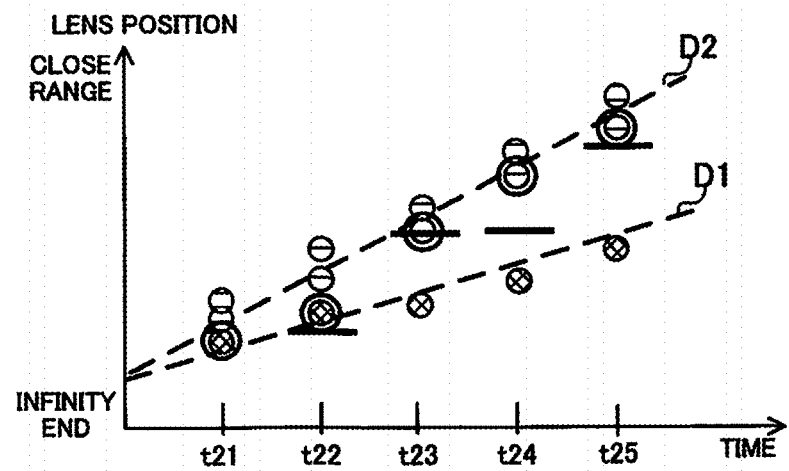
Figure 28C:
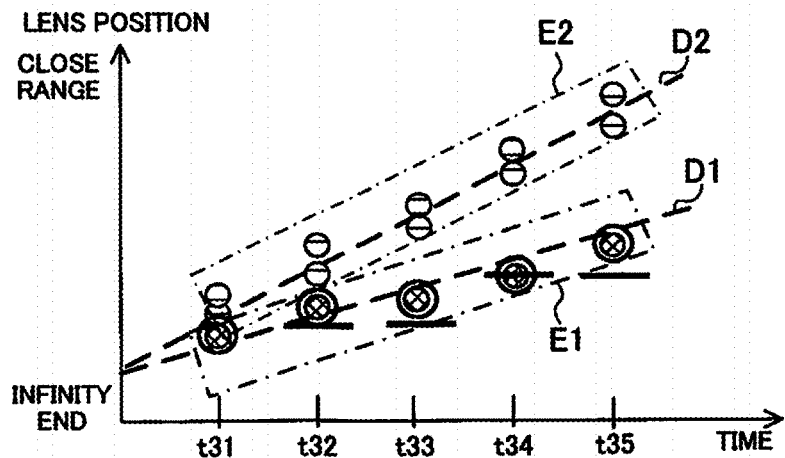

Next, one example of focus adjustment operation when shooting a moving subject will be described using FIG. 28A to FIG. 28C. FIG. 28A shows position of main subject C1 and unwanted subject C2 within the photographing screen, similarly to FIG. 27A. FIG. 28A is similar to FIG. 27A, and so detailed description is omitted. The vertical axis, horizontal axis, and legends in FIG. 28B and FIG. 28C are the same as in FIG. 27B and FIG. 27C, and so detailed description is omitted. It should be noted that main subject position D1 and unwanted subject position D2 are moving in the close-up direction in FIG. 28B and FIG. 28C, and so they both result in straight lines going upwards to the right.

FIG. 28B shows one example of a focus adjustment operation in a case where the first, second, and third priority ranges (areas) are not set within the set range (area) B0 for focus adjustment. With this example, at time t21 and time t22, an AF area corresponding to the main subject C1 is selected for focus adjustment, and reference position corresponding to the main subject C1 is used. However, at times t23, t24 and t25, AF area corresponding to the unwanted subject C2 is selected, and reference position corresponding to the unwanted subject C2 is used. This is because since there is no setting of the first, second, and third priority ranges (areas) and it is possible to select all AF areas within the set range (area) B0, as a result of a difference between focus target position TLP at the closest range at time t23 and the reference position at time t22 exceeding a predetermined value, reference position was changed at time t23. This is also because an AF area of a second focus target position TLP from the closest range was selected at time t23. In this way, with the example shown in FIG. 28B, since priority ranking is not set within the set area B0, there is a high possibility of focusing on an unwanted subject that is at the near side.

The example shown in FIG. 28C is a case where the first, second, and third priority ranges (areas) have been set within the set area B0 for focus adjustment, as was described for this embodiment. With this example, at each of times t31 to t35 an AF area (B1) that satisfies condition 1 and always corresponds to the main subject C1 is selected, and a reference position used in selection for every frame also conforms to the main subject position D1. Specifically, the fact that an AF area (frame E1 in the drawing) corresponding to main subject position D1 is selected is a result of preferentially selecting the first priority range (area) B1. Also, reference position used in selection for each frame is not updated in the event that reference determination processing is performed within the first priority range (area) (B1), and the previously described condition 4 is not satisfied (refer to time t32 to t33), but is updated if condition 4 is satisfied (refer to time t33 to t34). Further, the fact that an AF area corresponding to unwanted subject position D2 (refer to frame E2 in the drawing) is not selected is because the unwanted subject does not exist within the second and third priority ranges (areas) B2 and B3. In this way, in the example shown in FIG. 28C, by prioritizing the vicinity of the center within the set area B0 it is possible for the user to perform focusing on the subject that they intend to shoot.

<<Advantages of Focus Adjustment Device>

The focus adjustment device 1 of this embodiment gives priority to the center, within a focus adjustment area, when executing C-AF, for example. As a result, in order to focus on a main subject an appropriate autofocus (AF) area can be selected. In particular, with this embodiment, an AF area used in adjustment is selected from a plurality of AF areas, based on a focus target position of an AF area that is included within a range that has been selected, and a reference position that has been updated. In this way, since an AF area is selected taking into consideration reference position, focus changing abruptly is reduced without changing AF area abruptly.

In this way, the focus adjustment device 1 of this embodiment can prevent an AF area that exhibits a defocus amount conforming to a background unwanted subject being selected. Accordingly, if this technology is applied, then even in a case where shooting is performed for a subject that is a mix of near and far objects, a main subject that exhibits a defocus amount of the closest range is captured immediately after pressing down the 1st release, and it is possible to appropriately select an AF area exhibiting a defocus amount conforming to a main subject, and not a background unwanted subject.

The focus adjustment device 1 of this embodiment executes reference determination processing and third area selection processing during C-AF continuous shooting, for example. With the reference determination processing of this embodiment, reference position RP is not limited to lens position during exposure. Reference position RP is maintained or changed depending on ranging result. Also, various determinations are performed based on results for a specified number of frames. Also, with the third area selection processing of this embodiment, AF area selection is performed based on reference position RP that can be updated every frame in reference determination processing, and focus target position TLP which is an absolute position. In this way, by performing AF area selection based on reference position RP, even if there is a frame in which results of poor precision have been selected, such as erroneous ranging etc., then in frames after that it is possible to select an AF area that outputs focus target position TLP in the vicinity of the original in-focus position.

For example, even if an AF area that outputs a focus target position TLP that is away from the position of the main subject, due to erroneous ranging etc., temporarily exists, reference position RP is held in the vicinity of the position of the main subject. That is, with this technology, even if erroneous ranging results temporarily arise, since it is possible to select an AF area that outputs a focus target position TLP in the vicinity of the position of the main subject, it is possible to continue to focus on the main subject.

For example, reference position RP is not limited to lens pulse position of the focus lens 102a that has been driven to based on a motion prediction formula. For example, even in a case where a near side AF area is selected and the focus lens 102a is moved to the near side, the reference position RP before update is held for a specified number of frames. For this reason, the present invention can continue to focus on the main subject since it is possible to select an AF area that outputs a focus target position TLP in the vicinity of the position of the main subject, even if an AF area that outputs a focus target position TLP that deviates from the motion prediction formula temporarily exists.

For example, when a focus target position TLP that is away from the reference position RP is temporarily detected, the reference position RP is not changed, taking into consideration erroneous ranging. On the other hand, if a state where a focus target position TLP that is away from the reference position RP is detected continues, the reference position RP is changed taking into consideration the fact that the subject is moving. For this reason, the present technology can focus on a main subject that is approaching, even after having once focused on the background, by monitoring focus target position TLP at the closest range.

MODIFIED EXAMPLE

Up to now description has been given where defocus amount for a single AF area shows two ranging results, in the vertical direction and the horizontal direction, but this is not limiting. Defocus amounts may be respectively divided more finely in the vertical direction and the horizontal direction, for example, it is possible to have cases where 3 defocus amounts are calculated in the vertical direction and 3 defocus amounts are calculated in the horizontal direction. In a case where the horizontal direction and vertical direction is divided into three in this way, defocus amount may be calculated by dividing a single AF area into three positions, and division into three blocks of L, C and R within respective AF areas. It goes without saying that this case can also be realized using this technology by handling AF areas as 121×2 (vertical and horizontal)×3 blocks.

However, in the case of calculating defocus amount by further dividing AF areas in this way, processing amount for the defocus amount is increased, and processing time is also increased. In order to shorten processing time, it is preferable, at the time of executing block selection, for example, to execute block selection in a two-image interval value state before conversion to defocus amount and applying of various correction values. However, since it is also not possible to acquire motion prediction results at this time, the following determination processing is performed.

At this time, the determination section 216b performs determination (fifth determination) as to whether or not a two-image interval value having a positive value that satisfies a relationship of (minimum value of absolute value of positive two-image interval value)≤(minimum value of absolute value of negative two-image interval value×a constant) exists. In the event that a two-image interval value that satisfies the fifth determination exists, a block exhibiting this two-image interval value is selected. On the other hand, if a two-image interval value that satisfies the fifth determination does not exist, a block that exhibits a minimum value of absolute value of negative two-image interval value is selected.

It should be noted that the first area selection processing and the second area selection processing may also be performed using focus target position TLP that has been converted from defocus amount, instead of defocus amount. In this case, focus target position TLP for every AF area A1 for which defocus amount has been calculated is preferably calculated before these processes. Also, in this case, position of the focus lens 102a at that time may be used as reference position RP. For example, the time when defocus amount is positive is when focus target position TLP is more toward the near side than the reference position RP.

Also, regarding each of the sections within the CPU 216, besides being constructed in the form of software using a CPU and programs, some or all of these sections may be constructed with hardware circuits, or may have a hardware structure such as gate circuitry generated based on a programming language described using Verilog, or may use a hardware structure that uses software, such as a DSP (digital signal processor). Suitable combinations of these approaches may also be used. Calculation of defocus amount, calculation of reliability evaluation and contrast evaluation values, and generation of phase difference pixels etc. has been performed by repeating uniform computational processing, but these operations may also be configured using hardware circuits. Also, it is not limited to a CPU, and as long as it is an element that can perform the functions as a controller, processing for each of the above described sections may also be performed by one or more processors constructed as hardware. For example, each section may be configured as a processor that is constructed as respective electronic circuits, and may be respective circuit sections of a processor that has been constructed using integrated circuits, such as an FPGA (Field Programmable Gate Array). Also, a processor that is made up of one or more CPUs may be configured so as to execute the functions of respective sections, by reading out and executing computer programs that have been stored in a storage medium. Also, respective sections and respective circuits within the focus detection circuit 222, tracking circuit 234, face detection circuit 236 etc. may also be configured in software using the CPU and programs, and may use a program language etc., as described above. Also, the CPU 216, image processing circuit 218, image compression and expansion section 220, focus detection circuit 222, tracking circuit 234, face detection circuit 236 etc. make be configured as a single processor, and functions of each of these respective circuits etc. may be realized by plurality of processors.

Also, with the one embodiment of the present invention, an instrument for taking pictures has been described using a digital camera, but as a camera it is also possible to use a digital single lens reflex camera, a mirrorless camera, or a compact digital camera, or a camera for movie use such as a video camera, and further to have a camera that is incorporated into a mobile phone, a smartphone a portable information terminal, personal computer (PC), tablet type computer, game console etc., or a camera for medical use, a camera for a scientific instrument such as a microscope, a camera for mounting on a vehicle, a surveillance camera etc.

The present invention may be adopted in an endoscope etc. as a medical camera. By applying to an insertion section of an endoscope, in the middle of moving the insertion part inside a non-specimen into which the insertion part has been inserted, phase difference AF is executed, and it is possible to perform still picture continuous shooting that is in focus. In any event, it is possible to adopt the present invention as long as a device has a continuous shooting function.

Also, with respect to each of the processes shown in the flowcharts and each of the steps within the respective processes, their order can be changed, and it is also possible to add or delete processes and steps. Each of these processes is executed using respective programs that have been stored inside the interchangeable lens 100 or camera body 200. The respective programs may be stored in advance inside the interchangeable lens 100 or camera body 200, and may also be stored in a separate storage medium. There are various methods for performing this storage, and storage may at the time of product manufacture, items may be stored using a storage medium that has been distributed, and may be stored using communication circuits such as the Internet.

It should be noted that with the embodiment, parts described as "section" (section or unit) may be constructed by combining a dedicated circuit and a plurality of general purpose circuits, and as required may be constructed by combining a microcomputer that performs operations in accordance with software that has been programmed in advance, and a sequencer such as a processor such as a CPU, or an FPGA. Also, some or all of this control can be designed such that they are handled by external devices, and in this case there would be interaction with wired or wireless communication circuits. Communication may be performed by Bluetooth (registered trademark) communication, Wi-Fi communication, telephone lines, and may be performed using USB etc. Dedicated circuits, general purpose circuits and control sections may be formed integrally as an ASIC.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus adjustment device, provided with a plurality of AF areas, that repeatedly detects defocus amount for the AF areas, and performs adjustment of focus position by selecting an AF area based on the defocus amount, comprising:
   a processor having a range setting section, conversion section, reference setting section, range selection section, reference update section, and area selection section, wherein
   the range setting section sets a first range including at least one of the AF areas, or a second range including the first range,
   the conversion section converts each of a plurality of the defocus amounts that have been repeatedly detected to calculate a plurality of focus target positions,
   the reference setting section sets a focus position at a specified time point to a reference position,
   the range selection section, every time the defocus amount is detected, selects the first range or the second range based on focus target positions of AF areas included in the first range and AF areas included in the second range, and the reference position,
   the reference update section, every time the defocus amount is detected, updates the reference position based on the plurality of focus target positions of AF areas included in the selected one of the first range and the second range, and the reference position, and
   the area selection section, every time the defocus amount is detected, selects an AF area used in the adjustment from the plurality of AF areas, based on the plurality of focus target positions of AF areas included in the selected one of the first range and the second range, and the reference position that has been updated.

2. The focus adjustment device of claim 1, wherein:
   the range selection section selects the first range in an event that a difference between a focus target position of an AF area included in the first range, and the reference position, is within a first specified range.

3. The focus adjustment device of claim 2, wherein:
   the range selection section selects the second range in an event that a difference between a focus target position of an AF area included in the first range, and the reference position, is not within the first specified range.

4. The focus adjustment device of claim 2, wherein:
   the range selection section selects the second range in the event that there is a single AF area contained in the first range, a difference between the focus target position of an AF area included in the first range, and the reference position, is not within the first specified range, and a difference between the focus target position of an AF area included in the second range, and the reference position, is within a second specified range.

5. The focus adjustment device of claim 3, wherein
   the range selection section sets a third range that contains the second range, in the event that a difference between the focus target position of an AF area included in the second range, and the reference position, is not within the second specified range, and the area selection section selects an AF area based on the focus target position of an AF area that is contained in the third range, and the reference position that been updated.

6. The focus adjustment device of claim 2, wherein:

the reference update section updates the reference position in a case where a difference between the reference position and a focus target position that is closest to the reference position, among focus target positions of AF areas contained in the first range, is within a third specified range, and the area selection section selects an AF area within the first range.

7. The focus adjustment device of claim 6, wherein the reference update section updates a focus target position that is at the closest range, or at the second closest range, as a reference position.

8. The focus adjustment device of claim 6, wherein the reference update section updates the reference position when a difference between the reference position and a focus target position that is closest to the reference position is repeatedly within the third specified range continuously for a given number of times.

9. The focus adjustment device of claim 2, wherein:

the area selection section selects an AF area, among AF areas within the first range, exhibiting a focus target position that is closest to the reference position.

10. A focus adjustment method, for focus adjustment device, provided with a plurality of AF areas, that repeatedly detects defocus amount for the AF areas, and performs adjustment of focus position by selecting an AF area based on the defocus amount, comprising:

setting a first range including at least one of the AF areas, or a second range including the first range;

converting each of a plurality of the defocus amounts that have been repeatedly detected to calculate a plurality of focus target positions;

setting a focus position at a specified time point to the reference position;

every time the defocus amount is detected, selecting the first range or the second range based on focus target positions of AF areas included in the first range and the second range, and the reference position;

every time the defocus amount is detected, updating the reference position based on the plurality of focus target positions of AF areas included in the selected one of the first range and the second range, and the reference position; and every time the defocus amount is calculated, selecting an AF area used in the adjustment from the plurality of AF areas, based on the plurality of focus target positions of AF areas included in the selected one of the first range and the second range, and the reference position that has been updated.

11. The focus adjustment method of claim 10, further comprising:

selecting the first range in an event that a difference between a focus target position of an AF area included in the first range, and the reference position, is within the first specified range.

12. The focus adjustment method of claim 11, further comprising:

selecting the second range in an event that a difference between the focus target position of an AF area included in the first range, and the reference position, is not within the first specified range.

13. The focus adjustment method of claim 11, further comprising:

selecting the second range in the event that there is a single AF area contained in the first range, a difference between the focus target position of an AF area included in the first range, and the reference position, is not within the first specified range, and a difference between the focus target position of an AF area included in the second range, and the reference position, is within a second specified range.

14. The focus adjustment method of claim 12, further comprising:

setting a third range that contains the second range, in the event that a difference between the focus target position of an AF area included in the second range, and the reference position, is not within the second specified range, and selecting an AF area based on the focus target position of an AF area that is contained in the third range, and the reference position that been updated.

15. The focus adjustment method of claim 11, further comprising:

updating the reference position in a case where a difference between the reference position and a focus target position that is closest to the reference position, among focus target positions of AF areas contained in the first range, is within a third specified range, and selecting an AF area within the first range.

16. The focus adjustment method of claim 15, further comprising:

updating a focus target position that is at the closest range, or at the second closest range, as a reference position.

17. The focus adjustment method of claim 15, further comprising:

updating the reference position when a difference between the reference position and a focus target position that is closest to the reference position is repeatedly within the third specified range continuously for a given number of times.

18. A non-transitory computer-readable medium, storing a processor executable code, which when executed by at least one processor, performs a focus adjusting method, the one processor being provided in a focus adjustment device, the focus adjustment device being provided with a plurality of AF areas, repeatedly detecting defocus amount for the AF areas, and performing adjustment of focus position by selecting an AF area based on the defocus amount, the focus adjusting method comprising:

setting a first range including at least one of the AF areas, or a second range including the first range;

converting each of a plurality of the defocus amounts that have been repeatedly detected to calculate a plurality of focus target positions;

setting a focus position at a specified time point to the reference position;

every time the defocus amount is detected, selecting the first range or the second range based on focus target positions of AF areas included in the first range and AF areas included in the second range, and the reference position;

every time the defocus amount is detected, updating the reference position based on the plurality of focus target positions of AF areas included in the selected one of the first range and the second range, and the reference position; and every time the defocus amount is calculated, selecting an AF area used in the adjustment from the plurality of AF areas, based on the plurality of focus target positions of AF areas included in the selected one of the first range and the second range, and the reference position that has been updated.

19. The storage medium of claim 18, the focus adjustment method further comprising:
selecting the first range in an event that a difference between a focus target position of an AF area included in the first range, and the reference position, is within the first specified range.

20. The storage medium of claim 19, the focus adjustment method further comprising:
selecting the second range in an event that a difference between the focus target position of an AF area included in the first range, and the reference position, is not within the first specified range.

* * * * *